United States Patent
Reed

(10) Patent No.: US 9,288,873 B2
(45) Date of Patent: Mar. 15, 2016

(54) SYSTEMS, METHODS, AND APPARATUSES FOR USING A HIGH CURRENT SWITCHING DEVICE AS A LOGIC LEVEL SENSOR

(71) Applicant: Express Imaging Systems, LLC, Seattle, WA (US)

(72) Inventor: William G. Reed, Seattle, WA (US)

(73) Assignee: Express Imaging Systems, LLC, Renton, WA (US)

(*) Notice: Subject to any disclaimer, the term of this patent is extended or adjusted under 35 U.S.C. 154(b) by 104 days.

(21) Appl. No.: 14/179,737

(22) Filed: Feb. 13, 2014

(65) Prior Publication Data

US 2014/0225521 A1    Aug. 14, 2014

Related U.S. Application Data

(60) Provisional application No. 61/764,395, filed on Feb. 13, 2013.

(51) Int. Cl.

| H05B 37/00 | (2006.01) |
|---|---|
| H05B 39/00 | (2006.01) |
| H05B 41/14 | (2006.01) |
| H05B 37/02 | (2006.01) |
| H02M 1/10 | (2006.01) |
| H02M 1/00 | (2007.01) |

(52) U.S. Cl.
CPC ................. *H05B 37/02* (2013.01); *H02M 1/10* (2013.01); *H02M 2001/0006* (2013.01)

(58) Field of Classification Search
USPC ............................................. 315/200 R–208
See application file for complete search history.

(56) References Cited

U.S. PATENT DOCUMENTS

| 2,745,055 A | 5/1956 | Woerdemann |
| 3,374,396 A | 3/1968 | Bell et al. |
| 4,153,927 A | 5/1979 | Owens |
| 4,237,377 A | 12/1980 | Sansum |

(Continued)

FOREIGN PATENT DOCUMENTS

| DE | 4001980 A1 | 8/1990 |
| EP | 1 734 795 A1 | 12/2006 |

(Continued)

OTHER PUBLICATIONS

Japanese Office Action, dated Jan. 6, 2015, for corresponding Japanese Application No. 2011-536564, 6 pages.

(Continued)

*Primary Examiner* — Brandon S Cole
(74) *Attorney, Agent, or Firm* — Seed IP Law Group PLLC

(57) ABSTRACT

A line voltage signal at a first voltage and a first current supplied by a line voltage switching device responsive to a sensed or detected event can be provided to a first node of a regulator. A portion of the line voltage signal can be passed at the first voltage through a capacitive device in the regulator and provided at a second node for return to an electrical circuit containing a load device. The remaining portion of the line voltage signal can be passed to a voltage divider comprising at least a first resistive device and a second resistive device. A signal output at a second voltage and a second current that is suitable for introduction to a high-impedance controller input can be obtained at a third node electrically coupled to a point between the first resistive device and the second resistive device.

22 Claims, 6 Drawing Sheets

(56) References Cited

U.S. PATENT DOCUMENTS

| | | | |
|---|---|---|---|
| 4,663,521 A | 5/1987 | Maile | |
| 5,086,379 A | 2/1992 | Denison et al. | |
| 5,160,202 A | 11/1992 | Légaré | |
| 5,161,107 A | 11/1992 | Mayeaux et al. | |
| 5,230,556 A | 7/1993 | Canty et al. | |
| 5,276,385 A | 1/1994 | Itoh et al. | |
| 5,343,121 A | 8/1994 | Terman et al. | |
| 5,349,505 A | 9/1994 | Poppenheimer | |
| 5,450,302 A | 9/1995 | Maase et al. | |
| 5,561,351 A | 10/1996 | Vrionis et al. | |
| 5,589,741 A | 12/1996 | Terman et al. | |
| 5,808,294 A | 9/1998 | Neumann | |
| 5,869,960 A | 2/1999 | Brand | |
| 5,892,331 A * | 4/1999 | Hollaway | H05B 37/0218 315/151 |
| 5,892,335 A * | 4/1999 | Archer | H05B 41/28 315/224 |
| 5,929,574 A * | 7/1999 | Kim | H04N 3/227 315/370 |
| 5,936,362 A | 8/1999 | Alt et al. | |
| 6,111,739 A | 8/2000 | Wu et al. | |
| 6,149,283 A | 11/2000 | Conway et al. | |
| 6,154,015 A | 11/2000 | Ichiba | |
| 6,377,191 B1 | 4/2002 | Takubo | |
| 6,612,720 B1 | 9/2003 | Beadle | |
| 6,674,060 B2 | 1/2004 | Antila | |
| 6,681,195 B1 | 1/2004 | Poland et al. | |
| 6,746,274 B1 | 6/2004 | Verfuerth | |
| 6,753,842 B1 | 6/2004 | Williams et al. | |
| 6,828,911 B2 | 12/2004 | Jones et al. | |
| 6,841,947 B2 | 1/2005 | Berg-johansen | |
| 6,902,292 B2 | 6/2005 | Lai | |
| 6,985,827 B2 | 1/2006 | Williams et al. | |
| 7,019,276 B2 | 3/2006 | Cloutier et al. | |
| 7,066,622 B2 | 6/2006 | Alessio | |
| 7,081,722 B1 | 7/2006 | Huynh et al. | |
| 7,122,976 B1 | 10/2006 | Null et al. | |
| 7,188,967 B2 | 3/2007 | Dalton et al. | |
| 7,190,121 B2 | 3/2007 | Rose et al. | |
| 7,196,477 B2 | 3/2007 | Richmond | |
| 7,239,087 B2 | 7/2007 | Ball | |
| 7,252,385 B2 | 8/2007 | Engle et al. | |
| 7,258,464 B2 | 8/2007 | Morris et al. | |
| 7,270,441 B2 | 9/2007 | Fiene | |
| 7,281,820 B2 | 10/2007 | Bayat et al. | |
| 7,294,973 B2 | 11/2007 | Takahama et al. | |
| 7,314,291 B2 | 1/2008 | Tain et al. | |
| 7,317,403 B2 | 1/2008 | Grootes et al. | |
| 7,322,714 B2 | 1/2008 | Barnett et al. | |
| 7,330,568 B2 | 2/2008 | Nagaoka et al. | |
| 7,339,323 B2 | 3/2008 | Bucur | |
| 7,339,471 B1 | 3/2008 | Chan et al. | |
| 7,405,524 B2 | 7/2008 | Null et al. | |
| 7,438,440 B2 | 10/2008 | Dorogi | |
| 7,440,280 B2 | 10/2008 | Shuy | |
| 7,468,723 B1 | 12/2008 | Collins | |
| 7,524,089 B2 | 4/2009 | Park | |
| 7,538,499 B2 | 5/2009 | Ashdown | |
| 7,547,113 B2 | 6/2009 | Lee | |
| 7,559,674 B2 | 7/2009 | He et al. | |
| 7,564,198 B2 | 7/2009 | Yamamoto et al. | |
| 7,569,802 B1 | 8/2009 | Mullins | |
| 7,578,596 B2 | 8/2009 | Martin | |
| 7,578,597 B2 | 8/2009 | Hoover et al. | |
| 7,627,372 B2 | 12/2009 | Vaisnys et al. | |
| 7,631,324 B2 | 12/2009 | Buonasera et al. | |
| 7,633,463 B2 | 12/2009 | Negru | |
| 7,638,743 B2 | 12/2009 | Bartol et al. | |
| 7,677,753 B1 | 3/2010 | Wills | |
| 7,688,002 B2 | 3/2010 | Ashdown et al. | |
| 7,688,222 B2 | 3/2010 | Peddie et al. | |
| 7,703,951 B2 | 4/2010 | Piepgras et al. | |
| 7,746,003 B2 | 6/2010 | Verfuerth et al. | |
| D621,410 S | 8/2010 | Verfuerth et al. | |
| D621,411 S | 8/2010 | Verfuerth et al. | |
| 7,804,200 B2 | 9/2010 | Flaherty | |
| 7,834,922 B2 | 11/2010 | Kurane | |
| 7,932,535 B2 | 4/2011 | Mahalingam et al. | |
| 7,940,191 B2 | 5/2011 | Hierzer | |
| 7,952,609 B2 | 5/2011 | Simerly et al. | |
| 7,960,919 B2 | 6/2011 | Furukawa | |
| 7,983,817 B2 | 7/2011 | Breed | |
| 7,985,005 B2 | 7/2011 | Alexander et al. | |
| 8,100,552 B2 | 1/2012 | Spero | |
| 8,118,456 B2 | 2/2012 | Reed et al. | |
| 8,143,769 B2 | 3/2012 | Li | |
| 8,174,212 B2 | 5/2012 | Tziony et al. | |
| 8,334,640 B2 | 12/2012 | Reed et al. | |
| 8,344,665 B2 | 1/2013 | Verfuerth et al. | |
| 8,376,583 B2 | 2/2013 | Wang et al. | |
| 8,378,563 B2 | 2/2013 | Reed et al. | |
| 8,395,329 B2 | 3/2013 | Jutras et al. | |
| 8,445,826 B2 | 5/2013 | Verfuerth | |
| 8,476,565 B2 | 7/2013 | Verfuerth | |
| 8,508,137 B2 | 8/2013 | Reed | |
| 8,541,950 B2 | 9/2013 | Reed | |
| 8,586,902 B2 | 11/2013 | Verfuerth | |
| 8,604,701 B2 | 12/2013 | Verfuerth et al. | |
| 8,610,358 B2 | 12/2013 | Reed | |
| 8,629,621 B2 | 1/2014 | Reed | |
| 8,749,635 B2 | 6/2014 | Högasten et al. | |
| 8,764,237 B2 | 7/2014 | Wang et al. | |
| 8,779,340 B2 | 7/2014 | Verfuerth et al. | |
| 8,866,582 B2 | 10/2014 | Verfuerth et al. | |
| 8,884,203 B2 | 11/2014 | Verfuerth et al. | |
| 8,921,751 B2 | 12/2014 | Verfuerth | |
| 2002/0084767 A1 | 7/2002 | Arai | |
| 2003/0016143 A1 | 1/2003 | Ghazarian | |
| 2003/0184672 A1 | 10/2003 | Wu et al. | |
| 2004/0192227 A1 | 9/2004 | Beach et al. | |
| 2005/0231133 A1 | 10/2005 | Lys | |
| 2006/0014118 A1 | 1/2006 | Utama | |
| 2006/0066264 A1 | 3/2006 | Ishigaki et al. | |
| 2006/0098440 A1 | 5/2006 | Allen | |
| 2006/0146652 A1 | 7/2006 | Huizi et al. | |
| 2006/0208667 A1 | 9/2006 | Lys et al. | |
| 2007/0032990 A1 | 2/2007 | Williams et al. | |
| 2007/0102033 A1 | 5/2007 | Petrocy | |
| 2007/0164689 A1 * | 7/2007 | Suzuki | H05B 41/384 315/291 |
| 2007/0224461 A1 | 9/2007 | Oh | |
| 2007/0225933 A1 | 9/2007 | Shimomura | |
| 2008/0018261 A1 | 1/2008 | Kastner | |
| 2008/0043106 A1 | 2/2008 | Hassapis et al. | |
| 2008/0130304 A1 | 6/2008 | Rash et al. | |
| 2008/0224623 A1 | 9/2008 | Yu | |
| 2008/0232116 A1 | 9/2008 | Kim | |
| 2008/0266839 A1 | 10/2008 | Claypool et al. | |
| 2009/0046151 A1 | 2/2009 | Nagaoka et al. | |
| 2009/0058320 A1 | 3/2009 | Chou et al. | |
| 2009/0129067 A1 | 5/2009 | Fan et al. | |
| 2009/0153062 A1 | 6/2009 | Guo et al. | |
| 2009/0160358 A1 | 6/2009 | Leiderman | |
| 2009/0161356 A1 | 6/2009 | Negley et al. | |
| 2009/0167203 A1 | 7/2009 | Dahlman et al. | |
| 2009/0195179 A1 | 8/2009 | Joseph et al. | |
| 2009/0230883 A1 | 9/2009 | Haug | |
| 2009/0235208 A1 | 9/2009 | Nakayama et al. | |
| 2009/0261735 A1 | 10/2009 | Sibalich et al. | |
| 2009/0268023 A1 | 10/2009 | Hsieh | |
| 2009/0273290 A1 | 11/2009 | Ziegenfuss | |
| 2009/0278479 A1 | 11/2009 | Platner et al. | |
| 2009/0284155 A1 | 11/2009 | Reed et al. | |
| 2009/0315485 A1 | 12/2009 | Verfuerth et al. | |
| 2010/0001652 A1 | 1/2010 | Damsleth | |
| 2010/0052557 A1 | 3/2010 | Van Der Veen et al. | |
| 2010/0096460 A1 | 4/2010 | Carlson et al. | |
| 2010/0123403 A1 | 5/2010 | Reed | |
| 2010/0164406 A1 | 7/2010 | Kost et al. | |
| 2010/0171442 A1 | 7/2010 | Draper et al. | |
| 2010/0259193 A1 | 10/2010 | Umezawa et al. | |
| 2010/0270945 A1 | 10/2010 | Chang et al. | |
| 2010/0271802 A1 | 10/2010 | Recker et al. | |
| 2010/0277082 A1 | 11/2010 | Reed et al. | |

(56) References Cited

U.S. PATENT DOCUMENTS

| | | |
|---|---|---|
| 2010/0295946 A1 | 11/2010 | Reed et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0204845 A1 | 8/2011 | Paparo et al. |
| 2011/0215731 A1 | 9/2011 | Jeong et al. |
| 2011/0221346 A1 | 9/2011 | Lee et al. |
| 2011/0248812 A1 | 10/2011 | Hu et al. |
| 2011/0251751 A1 | 10/2011 | Knight |
| 2011/0310605 A1 | 12/2011 | Renn et al. |
| 2012/0001566 A1 | 1/2012 | Josefowicz et al. |
| 2012/0019971 A1 | 1/2012 | Flaherty et al. |
| 2012/0038490 A1 | 2/2012 | Verfuerth |
| 2012/0119669 A1 | 5/2012 | Melanson et al. |
| 2012/0169053 A1 | 7/2012 | Tchoryk, Jr. et al. |
| 2012/0209755 A1 | 8/2012 | Verfuerth et al. |
| 2012/0221154 A1 | 8/2012 | Runge |
| 2012/0224363 A1 | 9/2012 | Van De Ven |
| 2012/0230584 A1 | 9/2012 | Kubo et al. |
| 2012/0262069 A1 | 10/2012 | Reed |
| 2013/0033183 A1 | 2/2013 | Verfuerth et al. |
| 2013/0049613 A1 | 2/2013 | Reed |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0141010 A1 | 6/2013 | Reed et al. |
| 2013/0154488 A1* | 6/2013 | Sadwick ............ H05B 33/0815 315/172 |
| 2013/0163243 A1 | 6/2013 | Reed |
| 2013/0193857 A1 | 8/2013 | Tlachac et al. |
| 2013/0229518 A1 | 9/2013 | Reed et al. |
| 2013/0235202 A1 | 9/2013 | Nagaoka et al. |
| 2013/0249479 A1 | 9/2013 | Partovi |
| 2013/0307418 A1 | 11/2013 | Reed |
| 2013/0313982 A1 | 11/2013 | Reed |
| 2013/0340353 A1 | 12/2013 | Whiting et al. |
| 2014/0001961 A1 | 1/2014 | Anderson et al. |
| 2014/0070964 A1 | 3/2014 | Rupprath et al. |
| 2014/0078308 A1 | 3/2014 | Verfuerth |
| 2014/0097759 A1 | 4/2014 | Verfuerth et al. |
| 2014/0203714 A1 | 7/2014 | Zhang et al. |
| 2014/0265894 A1 | 9/2014 | Weaver |
| 2014/0313719 A1 | 10/2014 | Wang et al. |
| 2015/0015716 A1 | 1/2015 | Reed et al. |
| 2015/0077019 A1 | 3/2015 | Reed et al. |
| 2015/0280782 A1* | 10/2015 | Airbinger ................ H04B 3/54 315/307 |
| 2015/0312983 A1* | 10/2015 | Hu ..................... H05B 33/0815 315/186 |

FOREIGN PATENT DOCUMENTS

| | | | |
|---|---|---|---|
| EP | 2 559 937 | A1 | 2/2013 |
| EP | 1 459 600 | B1 | 2/2014 |
| EP | 2 781 138 | A1 | 9/2014 |
| FR | 2 883 306 | A1 | 9/2006 |
| JP | 6-335241 | A | 12/1994 |
| JP | 2001-333420 | A | 11/2001 |
| JP | 2004-279668 | A | 10/2004 |
| JP | 2004-320024 | A | 11/2004 |
| JP | 2004-349065 | A | 12/2004 |
| JP | 2005-93171 | A | 4/2005 |
| JP | 2005-198238 | A | 7/2005 |
| JP | 2005-310997 | A | 11/2005 |
| JP | 2006-179672 | A | 7/2006 |
| JP | 2006-244711 | A | 9/2006 |
| JP | 2008-59811 | A | 3/2008 |
| JP | 2008-509538 | A | 3/2008 |
| JP | 2008-130523 | A | 6/2008 |
| JP | 2008-159483 | A | 7/2008 |
| JP | 2008-177144 | A | 7/2008 |
| JP | 2008-535279 | A | 8/2008 |
| JP | 2010-504628 | A | 2/2010 |
| KR | 2005078403 | A | 8/2005 |
| KR | 10-2006-0086254 | A | 7/2006 |
| KR | 10-2009-0042400 | A | 4/2009 |
| KR | 10-0935736 | B1 | 1/2010 |
| KR | 20-2010-007230 | U | 7/2010 |
| KR | 10-1001276 | B1 | 12/2010 |
| KR | 10-1044224 | B1 | 6/2011 |
| KR | 10-1150876 | B1 | 5/2012 |
| WO | 02/076068 | A1 | 9/2002 |
| WO | 03/056882 | A1 | 7/2003 |
| WO | 2005/003625 | A1 | 1/2005 |
| WO | 2006/057866 | A2 | 6/2006 |
| WO | 2007/023454 | A1 | 3/2007 |
| WO | 2007/036873 | A2 | 4/2007 |
| WO | 2008/030450 | A2 | 3/2008 |
| WO | 2008/034242 | A1 | 3/2008 |
| WO | 2009/040703 | A2 | 4/2009 |
| WO | 2011/063302 | A2 | 5/2011 |
| WO | 2011/129309 | A1 | 10/2011 |
| WO | 2012/006710 | A1 | 1/2012 |
| WO | 2012/142115 | A2 | 10/2012 |
| WO | 2013/074900 | A1 | 5/2013 |
| WO | 2014/018773 | A1 | 1/2014 |
| WO | 2014/039683 | A1 | 3/2014 |
| WO | 2014/078854 | A1 | 5/2014 |

OTHER PUBLICATIONS

Reed et al., "Apparatus and Method of Operating a Luminaire," Office Action mailed Dec. 22, 2014, for U.S. Appl. No. 13/558,191, 17 pages.

Reed, "Adjustable Output Solid-State Lighting Device," Office Acton mailed Jan. 2, 2015, for U.S. Appl. No. 13/707,123, 24 pages.

Reed, "Electronic Control to Regulate Power for Solid-State Lighting and Methods Thereof," Amendment filed Dec. 15, 2014, for U.S. Appl. No. 12/619,535, 21 pages.

Reed, "Luminaire With Ambient Sensing and Autonomous Control Capabilities," Office Action mailed Dec. 17, 2014, for U.S. Appl. No. 13/786,332, 20 pages.

"LCD Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.

EE Herald, "Devices to protect High brightness LED from ESD," dated Mar. 16, 2009, retrieved Jun. 10, 2011, retrieved from http://www.eeherald.com/section/new-products/np100779.html, 1 page.

Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.

Huang, "Designing an LLC Resonant Half-Bridge Power Converter," 2010 Texas Instruments Power Supply Design Seminar, SEM1900, Topic 3, TI Literature Number: SLUP263, Copyright 2010, 2011, Texas Instruments Incorporated, 28 pages.

International Search Report, mailed Jul. 9, 2009 for PCT/US2009/043171, 5 pages.

International Search Report, mailed Jun. 21, 2010 for PCT/US2009/064625, 3 pages.

International Search Report, mailed Dec. 13, 2010 for PCT/US2010/035649, 3 pages.

International Search Report, mailed Dec. 15, 2010 for PCT/US2010/035658, 3 pages.

International Search Report, mailed Dec. 28, 2010 for PCT/US2010/035651, 3 pages.

International Search Report, mailed Sep. 30, 2011 for PCT/US2011/021359, 3 pages.

International Search Report, mailed Oct. 8, 2012 for PCT/US2012/033059, 3 pages.

International Search Report, mailed Jan. 14, 2013 for PCT/US2012/052009, 3 pages.

International Search Report, mailed Feb. 27, 2013 for PCT/US2012/065476, 3 pages.

International Search Report, mailed Nov. 19, 2013 for PCT/US2013/052092, 4 pages.

(56) References Cited

OTHER PUBLICATIONS

International Search Report, mailed Dec. 30, 2013 for PCT/US2013/058266, 3 pages.
Kadirvel et al., "Self-Powered, Ambient Light Sensor Using bq25504," Texas Instruments, Application Report, SLUA629—Jan. 2012, 6 pages.
Littelfuse, "Application Note: Protecting LEDs in Product Designs," 2009, 2 pages.
Panasonic Electronic Components, "LED Lighting Solutions," 2009, 6 pages.
Reed et al., "Adjustable Output Solid-State Lamp With Security Features," U.S. Appl. No. 61/561,616, filed Nov. 18, 2011, 33 pages.
Reed et al., "Apparatus and Method for Schedule Based Operation of a Luminaire" U.S. Appl. No. 13/604,327, filed Sep. 5, 2012, 44 pages.
Reed et al., "Apparatus and Method of Operating a Luminaire," U.S. Appl. No. 13/558,191, filed Jul. 25, 2012, 84 pages.
Reed et al., "Apparatus, Method to Change Light Source Color Temperature With Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Electrically Isolated Heat Sink for Solid-State Light," U.S. Appl. No. 61/229,435, filed Jul. 29, 2009, 29 pages.
Reed et al., "Gas-Discharge Lamp Replacement," U.S. Appl. No. 61/052,924, filed May 13, 2008, 32 pages.
Reed et al., "Gas-Discharge Lamp Replacement With Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Long-Range Motion Detection for Illumination Control," Office Action mailed Dec. 21, 2012, for U.S. Appl. No. 12/784,080, 26 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Office Action mailed Jul. 22, 2013, for U.S. Appl. No. 12/784,080, 29 pages.
Reed et al., "Long-Range Motion Detection for Illumination Control," Amendment filed Sep. 27, 2013, for U.S. Appl. No. 12/784,080, 20 pages.
Reed et al., "Low-Profile Pathway Illumination System," U.S. Appl. No. 61/051,619, filed May 8, 2008, 25 pages.
Reed et al., "Low-Profile Pathway Illumination System," Office Action, dated May 5, 2011, for U.S. Appl. No. 12/437,472, 24 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," Notice of Allowance, dated Oct. 14, 2011, for U.S. Appl. No. 12/437,472, 9 pages.
Reed et al., "Remotely Adjustable Solid-State Lamp," U.S. Appl. No. 61/641,781, filed May 2, 2012, 65 pages.
Reed et al., "Remotely Adjustable Solid-State Lamp," U.S. Appl. No. 13/875,130, filed May 1, 2013, 65 pages.
Reed et al., "Turbulent Flow Cooling for Electronic Ballast," U.S. Appl. No. 61/088,651, filed Aug. 13, 2008, 23 pages.
Reed, "Adjustable Output Solid-State Lighting Device," U.S. Appl. No. 61/567,308, filed Dec. 6, 2011, 49 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Office Action mailed Apr. 24, 2013, for U.S. Appl. No. 12/784,091, 12 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Notice of Allowance mailed May 23, 2013, for U.S. Appl. No. 12/784,091, 6 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination," Office Action mailed Dec. 5, 2012, for U.S. Appl. No. 12/784,093, 13 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination Using Received Signals," Office Action mailed Oct. 1, 2013, for U.S. Appl. No. 13/085,301, 11 pages.
Reed, "Apparatus and Method of Energy Efficient Illumination Using Received Signals," Amendment filed Jan. 2, 2014, for U.S. Appl. No. 13/085,301, 26 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Electronic Control to Regulate Power for Solid-State Lighting and Methods Thereof," Office Action mailed Feb. 28, 2013, for U.S. Appl. No. 12/619,535, 17 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electrostatic Discharge Protection for Luminaire," Office Action mailed Mar. 15, 2013, for U.S. Appl. No. 13/212,074, 11 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "High Efficiency Power Controller for Luminaire," U.S. Appl. No. 61/905,699, filed Nov. 18, 2013, 5 pages.
Reed, "Luminaire With Ambient Sensing and Autonomous Control Capabilities," U.S. Appl. No. 61/728,150, filed Nov. 19, 2012, 83 pages.
Reed, "Luminaire With Ambient Sensing and Autonomous Control Capabilities," U.S. Appl. No. 13/786,332, filed Mar. 5, 2013, 86 pages.
Reed, "Luminaire With Atmospheric Electrical Activity Detection and Visual Alert Capabilities," U.S. Appl. No. 61/694,159, filed Aug. 28, 2012, 52 pages.
Reed, "Luminaire With Atmospheric Electrical Activity Detection and Visual Alert Capabilities," U.S. Appl. No. 13/786,114, filed Mar. 5, 2013, 52 pages.

(56) References Cited

OTHER PUBLICATIONS

Reed, "Luminaire With Switch-Mode Converter Power Monitoring," U.S. Appl. No. 61/723,675, filed Nov. 7, 2012, 73 pages.
Reed, "Luminaire With Switch-Mode Converter Power Monitoring," U.S. Appl. No. 14/074,166, filed Nov. 7, 2013, 73 pages.
Reed, "Photocontrol for Luminaire Consumes Very Low Power," U.S. Appl. No. 61/849,841, filed Jul. 24, 2013, 41 pages.
Reed, "Resonant Network for Reduction of Flicker Perception in Solid State Lighting Systems," U.S. Appl. No. 61/527,029, filed Aug. 24, 2011, 41 pages.
Reed, "Resonant Network for Reduction of Flicker Perception in Solid State Lighting Systems," Notice of Allowance mailed Sep. 30, 2013, for U.S. Appl. No. 13/592,590, 9 pages.
Reed, "Solid State Hospitality Lamp," U.S. Appl. No. 61/692,619, filed Aug. 23, 2012, 32 pages.
Reed, "Solid State Hospitality Lamp," U.S. Appl. No. 13/973,696, filed Aug. 22, 2013, 32 pages.
Reed, "Solid State Lighting, Drive Circuit and Method of Driving Same," U.S. Appl. No. 61/640,963, filed May 1, 2012, 24 pages.
Reed, "Systems, Methods, and Apparatuses for Using a High Current Switching Device as a Logic Level Sensor," U.S. Appl. No. 61/764,395, filed Feb. 13, 2013, 48 pages.
Renesas Electronics, "Zener Diodes for Surge Absorption—Applications of high-intensity LED," Apr. 2010, 1 page.
Renn et al., "Solid State Lighting Device and Method Employing Heat Exchanger Thermally Coupled Circuit Board," U.S. Appl. No. 61/357,421, filed Jun. 22, 2010, 49 pages.
Tyco Electronics, "Circuit Protection," retrieved Jun. 10, 2011, retrieved from http://www.tycoelectronics.com/en/products/circuit-protection.html, 2 pages.
Written Opinion, mailed Jul. 9, 2009 for PCT/US2009/043171, 8 pages.
Written Opinion, mailed Jun. 21, 2010 for PCT/US2009/064625, 5 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Sep. 30, 2011 for PCT/US2011/021359, 4 pages.
Written Opinion, mailed Oct. 8, 2012 for PCT/US2012/033059, 3 pages.
Written Opinion, mailed Jan. 14, 2013 for PCT/US2012/052009, 5 pages.
Written Opinion, mailed Feb. 27, 2013, for PCT/US2012/065476, 8 pages.
Written Opinion, mailed Nov. 19, 2013 for PCT/US2013/052092, 7 pages.
Written Opinion, mailed Dec. 30, 2013 for PCT/US2013/058266, 8 pages.
International Search Report, mailed Feb. 26, 2014, for PCT/US2013/070794, 3 pages.
Poplawski, "Exploring Flicker & LEDs," 2010 DOE SSL Market Introduction Workshop, U.S. Department of Energy, Jul. 22, 2010, 16 pages.
Reed et al., "Adjustable Output Solid-State Lamp With Security Features," Office Action mailed Feb. 27, 2014, for U.S. Appl. No. 13/679,687, 11 pages.
Reed et al., "Long-Range Motion Detection for Illumination Control," Office Action mailed Jan. 30, 2014, for U.S. Appl. No. 12/784,080, 26 pages.
Reed, "Photocontrol for Luminaire Consumes Very Low Power," U.S. Appl. No. 14/158,630, filed Jan. 17, 2014, 71 pages.
Written Opinion, mailed Feb. 26, 2014, for PCT/US2013/070794, 10 pages.
Reed et al., "Apparatus and Method for Schedule Based Operations of a Luminaire," Office Action mailed Mar. 2, 2015, for U.S. Appl. No. 14/552,274, 7 pages.
Reed et al., "Apparatus and Method of Operating a Luminaire," Amendment filed Mar. 19, 2015, for U.S. Appl. No. 13/558,191, 20 pages.
Reed et al., "Systems and Methods That Employ Object Recognition," Office Action mailed Feb. 9, 2015, for U.S. Appl. No. 13/411,321, 40 pages.
Reed, "Adjustable Output Solid-State Lighting Device," Amendment filed Apr. 2, 2015, for U.S. Appl. No. 13/707,123, 14 pages.
Reed, "Ambient Light Control in Solid State Lamps and Luminaires," Amendment filed Jan. 29, 2015, for U.S. Appl. No. 14/609,168, 12 pages.
Reed, "Ambient Light Control in Solid State Lamps and Luminaires," U.S. Appl. No. 14/609,168, filed Jan. 29, 2015, 77 pages.
Reed, "Low Power Photocontrol for Luminaire," U.S. Appl. No. 62/137,666, filed Mar. 24, 2015, 36 pages.
Reed, "Luminaire With Adjustable Illumination Pattern," U.S. Appl. No. 62/114,826, filed Feb. 11, 2015, 68 pages.
Reed, "Luminaire With Ambient Sensing and Autonomous Control Capabilities," Amendment filed Mar. 13, 2015, for U.S. Appl. No. 13/786,332, 23 pages.
Reed et al., "Apparatus and Method for Schedule Based Operation of a Luminaire," Office Action mailed Mar. 26, 2014, for U.S. Appl. No. 13/604,327, 10 pages.
Reed et al., "Long-Range Motion Detection for Illumination Control," Amendment filed Apr. 28, 2014, for U.S. Appl. No. 12/784,080, 20 pages.
Reed, "Apparatus and Method of Energy Efficient Illumination," Notice of Allowance mailed Apr. 11, 2014, for U.S. Appl. No. 13/943,537, 9 pages.
Reed, "Apparatus and Method of Energy Efficient Illumination Using Received Signals," Office Action mailed Apr. 23, 2014, for U.S. Appl. No. 13/085,301, 12 pages.
Reed, "Electronic Control to Regulate Power for Solid-State Lighting and Methods Thereof," Office Action mailed Mar. 26, 2014, for U.S. Appl. No. 12/619,535, 16 pages.
Reed et al., "Adjustable Output Solid-State Lamp With Security Features," Amendment filed Jun. 24, 2014, for U.S. Appl. No. 13/679,687, 11 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Notice of Allowance mailed Jul. 7, 2014, for U.S. Appl. No. 13/604,327, 8 pages.
Reed et al., "Long-Range Motion Detection for Illumination Control," Notice of Allowance mailed Jun. 20, 2014, for U.S. Appl. No. 12/784,080, 7 pages.
Reed, "Apparatus and Method of Energy Efficient Illumination," U.S. Appl. No. 14/329,508, filed Jul. 11, 2014, 61 pages.
Reed, "Apparatus and Method of Energy Efficient Illumination Using Received Signals," Amendment filed Jul. 23, 2014, for U.S. Appl. No. 13/085,301, 12 pages.
Reed, "Electronic Control to Regulate Power for Solid-State Lighting and Methods Thereof," Amendment filed May 27, 2014, for U.S. Appl. No. 12/619,535, 22 pages.
Reed, "Luminaire With Atmospheric Electrical Activity Detection and Visual Alert Capabilities," Notice of Allowance mailed Jul. 1, 2014, for U.S. Appl. No. 13/786,114, 9 pages.
Extended European Search Report, dated Aug. 13, 2014, for corresponding European Application No. 09826926.9, 8 pages.
Reed et al., "Adjustable Output Solid-State Lamp With Security Features," Notice of Allowance mailed Aug. 29, 2014, for U.S. Appl. No. 13/679,687, 9 pages.
Reed et al., "Systems and Methods That Employ Object Recognition," Office Action mailed Aug. 25, 2014, for U.S. Appl. No. 13/411,321, 35 pages.
Reed, "Apparatus and Method of Energy Efficient Illumination," Office Action mailed Aug. 28, 2014, for U.S. Appl. No. 14/329,508, 8 pages.
Reed, "Apparatus and Method of Energy Efficient Illumination Using Received Signals," Notice of Allowance mailed Jul. 30, 2014, for U.S. Appl. No. 13/085,301, 5 pages.

(56) References Cited

OTHER PUBLICATIONS

Reed, "Electronic Control to Regulate Power for Solid-State Lighting and Methods Thereof," Office Action mailed Aug. 14, 2014, for U.S. Appl. No. 12/619,535, 16 pages.

International Search Report mailed Nov. 11, 2014, for International Application No. PCT/US2014/047867, 3 pages.

Reed et al., "Systems and Methods That Employ Object Recognition," Amendment filed Nov. 21, 2014, for U.S. Appl. No. 13/411,321, 20 pages.

Reed, "Apparatus and Method of Energy Efficient Illumination," Amendment filed Sep. 30, 2014, for U.S. Appl. No. 14/329,508, 18 pages.

Reed, "Apparatus and Method of Energy Efficient Illumination," Notice of Allowance mailed Nov. 5, 2014, for U.S. Appl. No. 14/329,508, 10 pages.

Reed, "Apparatus and Method of Energy Efficient Illumination Using Received Signals," U.S. Appl. No. 14/557,275, filed Dec. 1, 2014, 92 pages.

Reed, "High Efficiency Power Controller for Luminaire," U.S. Appl. No. 14/546,354, filed Nov. 18, 2014, 33 pages.

Written Opinion mailed Nov. 11, 2014, for International Application No. PCT/US2014/047867, 5 pages.

Extended European Search Report, dated Oct. 15, 2015, for corresponding European Application No. 12825132.9-1802, 5 pages.

Extended European Search Report, dated Sep. 28, 2015, for corresponding European Application No. 12850159.0-1802, 6 pages.

Extended European Search Report dated Oct. 21, 2015, for corresponding EP Application No. 13835001.2-1802, 7 pages.

Reed, "Adjustable Output Solid-State Lighting Device," Office Action mailed Oct. 5, 2015, for U.S. Appl. No. 13/707,123, 23 pages.

Reed, "High Efficiency Power Controller for Luminaire," Office Action mailed Sep. 10, 2015, for U.S. Appl. No. 14/546,354, 14 pages.

Reed, "Luminaire With Switch-Mode Converter Power Monitoring," Notice of Allowance mailed Nov. 18, 2015, for U.S. Appl. No. 14/074,166, 8 pages.

\* cited by examiner

SYSTEMS, METHODS, AND APPARATUSES FOR USING A HIGH CURRENT SWITCHING DEVICE AS A LOGIC LEVEL SENSOR

BACKGROUND

1. Technical Field

The present disclosure generally relates to the field of electrical converters and, more particularly, electrical converters that permit the use of a line voltage switching device as an input to a high-impedance controller input.

2. Description of the Related Art

Electrical devices are frequently automated using one or more line voltage switching devices. At times, the line switching device can be coupled to one or more environmental sensors to permit the electrical load controlled by the switching device to respond to the occurrence of one or more events. An example includes electrical devices such as access control arm motors that automatically rise when the motion associated with an approaching vehicle is detected. Another example includes electrical devices such as luminaires that automatically illuminate when a change in ambient light level is detected. Other sensors such as proximity sensors, stress and strain sensors, load cells, and the like may also be electrically and operably coupled to a switching device rated for use at relatively high line voltages (e.g., 90 VAC to 600 VAC) and at relatively high currents (e.g., milliamps and higher).

The design and materials of construction selected for the electrical contactors and the switching device are based upon the expected conditions found in line voltage service. For example, electrical contactors may be designed to handle the arcing and high current flows that sometimes accompany opening or closing the switching device controlling the line voltage supply to an electrical device. In many instances, the design and materials of construction of the electrical contacts in the switching device may include silver or other metal alloys upon which oxides and sulfides form during normal operation. At line voltage and current, such oxides and sulfides may present a negligible resistance to the passage of current through the contacts. However, at lower voltages (e.g., 3V to 24V) and currents (e.g., microamps) such as those used for logic level signaling, the impedance presented by contaminants including oxide and sulfide accumulations can hinder or even prevent the transmission of current through the contacts. Thus, line voltage switching devices, particularly those remaining in satisfactory condition and having significant remaining service life after use in line voltage switching applications, are typically unsuitable for use in applications where the switching of relatively low voltage and relatively low current signals is required.

In response to the increasing emphasis placed on energy efficiency, many replacement electrical devices are fully or partially automated or operated using one or more low voltage or solid state control devices or controllers. Such solid state controllers provide significant flexibility in the operation of the electrical device, often while providing energy saving benefits. In many instances, the retrofitting of traditional electrical devices with energy efficiency replacements (e.g., replacing high-intensity discharge or metal halide light sources with solid state light sources) is performed in conjunction with the installation of one or more solid state controllers or processors to control the replacement electrical device.

BRIEF SUMMARY

While the one or more environmental sensors used to control the operation of a line voltage switch may be useful for controlling one or more aspects of an energy efficient replacement device, in many instances simply passing a low voltage, low current, signal provided by the environmental sensor through the line voltage contacts of the line voltage switch may not provide satisfactory or reliable operation of the replacement electrical device. Additionally, a simple replacement of the line voltage switching device with a low voltage switching device is discouraged as cost ineffective since replacement of the line voltage switching device frequently requires replacement of one or more integral or electrically coupled environmental sensors. In the face of an increased use of energy efficient electric devices and the prevalence of low voltage controllers used in conjunction with such devices, new strategies for the use of existing line voltage switching devices in low voltage service are needed.

With the advent of solid state power control devices there is less need for high current electromechanical relays and contactors to control large electrical loads. In many cases, changes in one or more ambient environmental conditions or the occurrence of one or more events in the environment, for example a change in an ambient illumination level indicative of a transition from day to night or night to day, may be autonomously sensed or otherwise detected using one or more environmental sensors or detectors. The output generated by the one or more environmental sensors or detectors may be used to control one or more operational aspects of an electrically driven load device. For example, the output generated by the one or more environmental sensors or detectors may be used to actuate the operation of one or more line voltage switching devices such as one or more legacy relays or contactors. Since the operational lifetime of such line voltage switching devices can exceed the operational lifetime of the electrical load device being controlled, it is advantageous to adapt or otherwise reuse such line voltage switching devices with replacement electrical load devices. With increasing frequency, one or more operational aspects of such replacement electrical load devices are controlled at least in part using a signal input communicated via a high-impedance controller input (e.g., MOSFET switches, IGBT switches or other very low current, high impedance inputs) to control device. In such instances it is particularly desirable to use the one or more environmental sensors or detectors coupled to these legacy line voltage switching devices to provide to a high-impedance controller input, at least one signal useful for controlling one or more aspects of a replacement electrical load device.

The design and materials of construction of the switching devices, and in particular, the electrical contacts used in at least some line voltage switching devices such as high current relays or contactors are unsuitable for low current signaling. Frequently, the materials or design used successfully in a high voltage application, where robustness may be considered paramount over any inherent resistance of the switching device, are unsuitable for the relatively low currents or voltages encountered in signaling service. For example, electrical contacts used in line voltage switches are often silver, a silver alloy, or other metal alloys upon which contamination may be deposited, and oxide or sulfide layers may form during normal operation. The high-impedance controller inputs found on many solid state controllers and other similar control devices may have an operating current limit that is tens, hundreds, or even thousands of times lower than the currents typically encountered in line voltage switching service. Such relatively low currents may be insufficient to reliably pass through the switching device to provide a satisfactory indication to a control device of the whether the line voltage switching device is in a CLOSED (i.e., electrically continuous) or an OPEN (i.e., electrically discontinuous) state.

A load resistor coupled between a high-impedance controller input and ground provides one option for producing sufficient current flow to reliably sense the state of the line voltage switching device while limiting the current flow to a high-impedance controller input. Shunting such a current flow to ground however can generate considerable heat and also reduces the overall efficiency of any electrical load device. Additionally, given the relatively high line voltages typically used to power legacy electrical devices, a resistive device rated for high power and voltage service is needed. Such power resistors can be physically quite large and may continuously generate heat while in operation. Smaller form factor electrical load devices may be unable to physically accommodate such a large power resistor. Additionally, smaller form factor electrical load devices may not be able to adequately dissipate the heat produced by the power resistor thereby unacceptably compromising the performance or operational lifetime of the replacement electrical load device.

A preferred alternative offering several advantages over simply shunting a portion of current to ground includes permitting sufficient current to flow through the line voltage switching device to reliably detect the operational state of the switching device, returning a significant portion of the current through a "non-dissipative" or similar near-lossless circuit to the electrical load device, and directing a smaller portion of the current at a lower voltage to a high-impedance controller input. Such a solution preserves energy efficiency while providing a signal reliably indicative of the state of the line voltage switching device and compatible with the high-impedance controller input.

One illustrative example is provided by a solid state luminaire which uses a legacy photosensitive transducer (i.e., a "Dusk to Dawn" sensor) operably coupled to a line voltage switching device (e.g., 15 Amp 305 VAC rated contacts) to detect illumination in the surrounding ambient environment. Line power at a first voltage (e.g., 277 VAC) and a first current (e.g., 0.5 Amps) can through the line voltage switching device when the switching device is in an electrically continuous operating state. The power flowing through the line voltage switching device can be provided, as a line voltage signal, to a regulator device. In the regulator device, a first portion of the received line voltage signal passes through one or more first capacitive devices (i.e., a "non-dissipative" circuit) and returns to the electrical circuit containing the electrical load device with the current lagging the voltage by 90°. A second portion of the received line voltage signal passes through a voltage divider that includes at least a first resistive device serially electrically coupled to a second resistive device. An output signal having voltage and current aspects compatible for provision to a high-impedance controller input can be obtained at a point between the first and the second resistive devices. Additional signal conditioning devices (e.g., overvoltage protection devices, overcurrent protection devices, current fluctuation damping devices, voltage fluctuation damping devices, etc.) may be electrically communicably coupled to the voltage divider circuit to further condition or limit one or more aspects of the output signal provided to the high-impedance controller input. In such an implementation, the capacitance of the one or more first capacitive devices may be selected to provide an inrush current less than the current rating of the line voltage switching device contacts while still large enough to cause at least several milliamps to flow through the line voltage switching device contacts.

A system to permit a line voltage switching device operable at a first voltage and a first current to provide, when in an electrically continuous state, an output signal to a high-impedance controller input used control the delivery of power at the first voltage from a line voltage source to a load device may be summarized as including: a first node electrically, communicably, coupled to the line voltage switching device to receive a line voltage signal from the line voltage switching device when the line voltage switching device is in the electrically continuous state; a second node that outputs at the first voltage a first portion of the line voltage signal received at the first node, the second node electrically, communicably, coupled through at least one first capacitive device to the first node; a voltage divider electrically, communicably, coupled to the first node, the voltage divider including at least a first resistive device serially electrically coupled to a second resistive device; and a third node that provides a second portion of the line voltage signal received at the first node as the output signal indicative of the electrically continuous state of the line voltage switching device to the high-impedance controller input, the third node electrically, communicably, coupled between the first resistive device and the second resistive device, the output signal at a second voltage lower than the first voltage and the output signal at a second current that is lower than the first current.

The system may further include the line voltage switching device that selectively, reversibly, switches between at least the electrically continuous state and an electrically discontinuous state responsive to an occurrence or lack of an occurrence of at least one event. The system may further include the line voltage source operating at the first voltage, the line voltage source electrically, communicably coupled to the line voltage switching device and to at least one controller that includes the high-impedance controller input. The system may further include the load device electrically, communicably coupled through at least one controller to the voltage source. The load device may include at least one solid state lighting device including at least one solid state light source. The first voltage may include an alternating current ("A.C.") voltage and the at least one controller may include a power converter that converts the A.C. voltage provided by the voltage source to a power signal provided to the at least one solid state lighting device when the line voltage switching device is in the electrically continuous state. The power converter may further include a switched-mode power supply and the power signal provided to the at least one solid state lighting device may include at least one of: a pulse-width modulated power signal or a pulse-frequency modulated power signal. The line voltage switching device may include a photosensitive device that selectively, reversibly, enters the electrically continuous state based on the occurrence of an event corresponding to a level of ambient illumination proximate the photosensitive device: rising above one or more defined ambient illumination thresholds, or falling below one or more defined ambient illumination thresholds. The system may further include at least one overvoltage protection device that limits the second voltage of the output signal provided at the third node to less than a defined second voltage threshold, the at least one overvoltage protection device electrically coupled in parallel with the second resistive device. The at least one overvoltage protection device may include at least one zener diode. The system may further include at least one damping device that dampens fluctuations in the second current of the output signal provided at the third node to less than a defined current threshold, the at least one damping device electrically coupled in parallel with the second resistive device. The at least one damping device may include at least one second capacitor.

A method to permit a line voltage switching device operable at a first voltage and a first current to provide, when in an electrically continuous state, an output signal to a high-impedance controller input used control the delivery of power at the first voltage from a line voltage source to a load device may be summarized as including: receiving a line voltage signal at a first node, the first node electrically, communicably, coupled to the line voltage switching device, the line voltage signal indicative of the presence of the line voltage switching device in the electrically continuous state; communicating a first output at the first voltage and including at least a first portion of the line voltage signal received at the first interface at a second node, the second node electrically, communicably, coupled through at least one first capacitive device to the first node; introducing at least a second portion of the line voltage signal received at the first node to a voltage divider electrically, communicably, coupled to the first node, the voltage divider including at least a first resistive device serially electrically coupled to a second resistive device; and communicating the output signal including at least a portion of the second portion of the line voltage signal to the high-impedance controller input via a third node, the third node electrically, communicably, coupled between the first resistive device and the second resistive device, the output signal at a second voltage that is lower than the first voltage and at a second current that is lower than the first current, the output signal indicative of the line voltage switching device in the electrically continuous state.

The method may further include limiting the second voltage to less than a defined second voltage threshold via at least one overvoltage protection device electrically, communicably, coupled in parallel with the second resistive device. The method may further include limiting the fluctuation of the second current via at least one damping device electrically, communicably, coupled in parallel with the second resistive device and the overvoltage protection device. Receiving a line voltage signal indicative of the line voltage switching device in an electrically continuous state at the first node may include: receiving the line voltage signal when the line voltage switching device is in an electrically continuous state responsive to an occurrence or lack of an occurrence of at least one event. Receiving the line voltage signal when the line voltage switching device is in an electrically continuous state responsive to an occurrence or lack of an occurrence of at least one event may include: receiving the line voltage signal when the line voltage switching device is in an electrically continuous state responsive to an occurrence or lack of an occurrence of at least one of: an event corresponding to a change in ambient lighting levels, or an event corresponding to movement of an object or a body. The method may further include receiving the output signal at the high-impedance controller input; and responsive to receipt of the output signal at the high-impedance controller input, adjusting by the controller a flow of power from the line voltage source to the communicably coupled load device. Communicating a first output at a second node, the first output at the first voltage and including a first portion of the line voltage signal received at the first node may include: communicating at least a portion of the first output to a circuit electrically communicably coupled between the second node and the at least one load.

An apparatus to permit a photosensitive line voltage switching device operated at a first voltage and controlling the operation of a solid state illumination device to provide a first output signal at the first voltage to an electrically coupled circuit and a signal output to a controller high-impedance input, the signal output indicative of the photosensitive line voltage switching device maintaining an electrically continuous state may be summarized as including: at least one first node that receives a voltage signal at the first voltage and the first current from the photosensitive line switching device when the photosensitive line switching device is placed in at least one electrically continuous state; at least one second node that provides the first output signal to the electrically coupled circuit including the solid state illumination device, the at least one second node electrically coupled through at least one first capacitive device to the at least one first interface, the first output signal including at least a first portion of the voltage signal at the first voltage; at least one voltage divider that accepts at least a second portion of the voltage signal at the first voltage, the at least one voltage divider electrically coupled to the at least one first interface, the at least one voltage divider including at least a first resistive device serially electrically coupled to a second resistive device; at least one third node that provides the signal output indicative of the photosensitive line voltage switching device being placed in the given electrically continuous state to the high-impedance controller input, the at least one third node electrically coupled between the first resistive device and the second resistive device, the signal output at a second voltage that is lower than the first voltage.

The apparatus may further include at least one second capacitive device that dampens current fluctuations in the second output signal, the at least one second capacitive device electrically coupled in parallel with the second resistive device. The apparatus may further include at least one overvoltage protection device that maintains the second voltage below a defined second voltage threshold, the at least one overvoltage protection device electrically coupled in parallel with the second resistive device and the at least one second capacitive device.

BRIEF DESCRIPTION OF THE SEVERAL
VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 1 is a block diagram of an illustrative system that permits a line voltage switching device operable at a first voltage and a first current to provide, when in an electrically continuous state, an output signal to a high-impedance controller input used control the delivery of power at the first voltage from a line voltage source to a load device, according to one non-limiting illustrated embodiment.

FIG. 2 is a schematic diagram of an illustrative system that permits a line voltage switching device operable at a first voltage and a first current to provide, when in an electrically continuous state, an output signal to a high-impedance controller input used control the delivery of power at the first voltage from a line voltage source to a load device, according to one non-limiting illustrated embodiment.

FIG. 3 is a high level flow diagram of an illustrative method that permits a line voltage switching device operable at a first voltage and a first current to provide, when in an electrically continuous state, an output signal to a high-impedance controller input used control the delivery of power at the first voltage from a line voltage source to a load device, according to one non-limiting illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In some instances, well-known or well-documented electrical components such as capacitive devices, resistive devices, diodes and the like have either not been shown or shown in an abstract manner and have not been described in detail to avoid unnecessarily obscuring descriptions of the embodiments. In other instances, well-known or well documented electronic systems such as environmental sensors, voltage sources, switched-mode power supplies, and solid state lighting devices have either not been shown or shown abstractly and have not described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense that is as "including, but not limited to."

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract of the Disclosure provided herein are for convenience only and do not interpret the scope or meaning of the embodiments.

Figure 1:
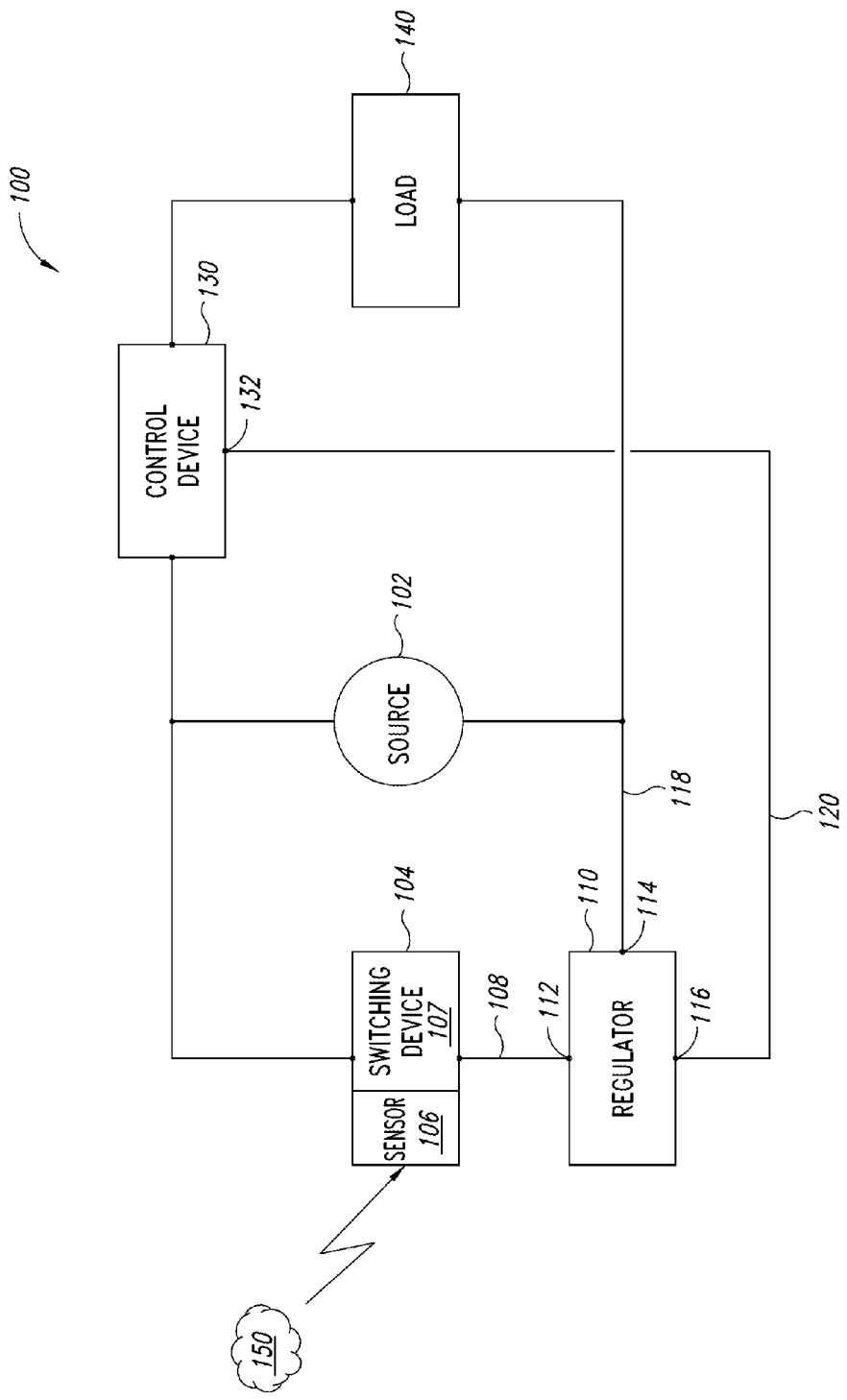

FIG. 1 shows an example system 100 that includes a voltage source 102 operable at a first voltage electrically, conductively, coupled to both a line voltage switching device 104 and at least one control device 130 used to control the delivery of power from the voltage source to a load device 140, according to one non-limiting illustrated embodiment. Responsive to detecting or otherwise sensing an occurrence or a lack of occurrence of an event in the environment 150, the line voltage switching device 104 may selectively, reversibly, transition between at least one electrically discontinuous state (i.e. a state that prevents or limits current flow to less than a defined threshold value) and at least one electrically continuous state (i.e., a state that permits or allows current flow above the defined threshold value). When in at least one electrically continuous state, the line voltage switching device 104 permits a line voltage signal 108 to flow from a voltage source 102 to a first node 112 of a regulator 110. The regulator 110 provides a first output 118 at a second node 114 that can be returned to the electrical circuit containing the load device 140. The regulator 110 further provides a signal output 120 at a third node 116 that can be provided to a high-impedance controller input 132 of the control device 130. The control device 130 can permit at least a portion of the power provided by the voltage source 102 to flow to the load device 140 based on one or more aspects of the received signal output 120.

The voltage source 102 can include any source of electrical power, including portable storage devices, electrical generators, or electrical power grids or mains. The voltage source 102 may be either a direct current ("D.C.") source or an alternating current ("A.C.") source. In at least some implementations, the voltage source 102 may include one or more devices capable of altering the current, voltage, or waveform of the electrical power supplied to the switching device 104, the control device 130, the load device 140, or any combination thereof. For example, one or more step down transformers, one or more step-up transformers, one or more inverters (e.g., D.C. to A.C. converters) or combinations thereof may be incorporated in or may be electrically communicably coupled to the voltage source 102. In at least some situations, the voltage source 102 may include a public or private power distribution system or "grid" capable of supplying a virtually unlimited quantity of power at a first voltage of from about 90 Volts A.C. ("VAC") to about 600 VAC and at a frequency of from about 50 Hertz ("Hz") to 60 Hz. In at least some situations, the voltage source 102 may provide single phase A.C. power (e.g., 110 VAC or 277 VAC) or multi-phase A.C. power (e.g., 3-phase 480 VAC or 575 VAC) power to the line voltage switching device 104, the control device 130, the load device 140 or any combination thereof.

The line voltage switching device 104 includes at least one environmental sensor 106 that is operably coupled to at least one switching device 107. In at least some instances, the at least one environmental sensor 106 and the switching device 107 may be physically coupled or integrally packaged in a common housing or enclosure. In at least some instances, the line voltage switching device 104 may be a modular or plug-in type component that is wired, electrically coupled with, or otherwise electrically interfaced to the load device 140.

The at least one environmental sensor 106 can sense or otherwise detect the occurrence or lack of occurrence of one or more events in the environment 150. Such events may include, without limitation, an ambient illumination level in the environment 150, a change in ambient illumination level in the environment 150, movement or displacement of a body or other object in the environment 150, presence of a body or other object in the environment 150, presence or absence of one or more electromagnetic emissions in the environment 150, or any other occurrence of an event occurring in the environment 150 that is sensible or otherwise detectable using any current or future developed sensing device, sensing technology, detection device, or detection technology.

The at least one environmental sensor 106 may be operably coupled to the switching device 107 such that the electrical continuity of the switching device 107 is changed or otherwise altered responsive to the sensing or detecting one or more defined event occurrences in the environment 150 by the at least one environmental sensor 106. For example, the at least one environmental sensor 106 may include a photosensitive transducer, photosensor, or "photocell" and the line voltage switching device 104 may be configured to autonomously transition the switching device 107 to an electrically continuous state when a low ambient illumination level is sensed or otherwise detected (e.g., a "dusk-to-dawn" or similar sensor). One non-limiting example of such an ambient light level controlled line voltage switching device 104 is an Intermatic Model K4135 Photocell Controller manufactured by Intermatic, Inc. (Spring Grove, Ill.). In another example, the at least one environmental sensor 106 may include an "occupancy sensor" (e.g., an infrared sensor capable of sensing or otherwise detecting the infrared signature of an object or body) and the line voltage switching device 104 may be configured to autonomously transition the switching device 107 to an electrically continuous state when a body providing the defined infrared signature is sensed or otherwise detected. One non-limiting example of such an occupancy controlled line voltage switching device 104 is a Philips ActiLume Classic Model LRM2368 as manufactured by Philips Lighting (Rosemont, Ill.). In at least some instances, multiple environmental sensors 106 may be included in the line voltage switching device 104. For example, one or more infrared sensors to sense or otherwise detect the infrared signature of an object or body in the environment 150 and one or more photocells to sense a level of ambient light in the environment 150 may be provided in a single line voltage switching device 104. One non-limiting example of such an occupancy and photocell controlled line voltage switching device 104 is a Philips ActiLume Classic Model LRM2345 as manufactured by Philips Lighting (Rosemont, Ill.).

The switching device 107 that can include any device, system or combination of systems and devices capable of selectively, reversibly, switching or otherwise transitioning between any number of states that include at least one electrically continuous state and at least one electrically discontinuous state. To interrupt the flow of electricity supplied by the voltage source 102 at the line voltage, the switching device 107 can include one or more electrical, mechanical, or electromechanical switches rated for use at line power (e.g., line voltage and line current) conditions. In multi-phase power supply applications, the switching device 107 may interrupt any number of phases. In at least some situations, the switching device 107 may include one or more sets of metallic electrical contacts for each phase of the power supplied by the voltage source 102. The materials of construction and design of such electrical contacts may be selected based on the inrush current or the expected quantity of power consumed by the load device 140. Often, the design and materials of construction of the electrical contacts in the switching device 107 provide an inherent resistance that is readily overcome at line voltages and under load currents. In at least some situations, the electrical contacts in the switching device 107 are fabricated using one or more metals or metal alloys upon which contaminants such as oxides and sulfides may deposit or accumulate during routine operation of the switching device 107. The presence of such contaminants on the electrical contacts of the switching device 107 may add to any inherent resistance present in the electrical contacts thereby further increasing the resistance of the switching devices 107.

At line voltage operating conditions such as at the line voltage provided by the voltage source 102, the resistance presented by the electrical contacts in the switching device 107 may be sufficiently negligible that the impact on the flow of power through the switching device 107 is minimized. However, if the line voltage switching device 104 is used in a low power application, such as to switch or otherwise control the signal input 120 to the high-impedance controller input 132, the total resistance presented by the electrical contacts in the switching device 107 may be sufficiently large that the relatively low signal current (e.g., microamps) is either unable to flow through the electrical contacts or unreliably flows through the electrical contacts in the switching device 107. In applications where the line voltage switching device 104 is used to provide a logic level input to the controller 130, increasing the current flow to overcome the resistance of the electrical contacts in the switching device 107 may result in an unacceptably high current level at the high-impedance controller input 132. While shunting a portion of the current through a resistance electrically coupled upstream of the high-impedance controller input 132 provides a potential solution, such a resistive shunt would generate considerable quantities of waste heat proximate the control device 130 and would detrimentally compromise the energy efficiency of the load device 140.

The regulator 110 permits sufficient current flow through the line voltage switching device 104 to overcome the inherent resistance of the electrical contacts and provides at the third node 116 an output signal 120 at a second voltage and a second current compatible with the high-impedance controller input 132. In at least some instances the second voltage can be less than the first voltage and the second current can be less than the first current. Additionally, the regulator 110 can advantageously return at the first voltage, a first portion 118 of the power received via the line voltage switching device 104 to the electrical circuit containing the load device 140.

The regulator 110 includes a first node 112 to which the switching device 107 is electrically communicably coupled, a second node 114 to which the electrical circuit containing the load device 140 is electrically, communicably, coupled, and a third node to which the high-impedance controller input 132 is electrically, communicably, coupled. The first node, the second node, and the third node can include any number of structures, systems, or devices capable of supporting or providing an electrical interface or connection to one or more external systems. Typical nodes can include terminals such as screw-type or blade-type terminals, spring release terminals, wire leads, or any other similar current or future electrical connector or interface. In at least some instances, the regulator 110 may be an enclosed or hermetically sealed device in which all or a portion of the first, the second, and the third nodes are exposed.

In at least some implementations, the line voltage signal 108 received at the first node 112 can be provided at the first voltage (i.e., the delivery voltage of the voltage source 102) and a first current. In some implementations, the first output 118 at the second node 114 can be provided at the first voltage. In some implementations, the signal output 120 at the third node 116 can be provided at a second voltage that is lower than the first voltage and a second current that is lower than the first current.

The control device 130 can include one or more devices, systems, or combination of devices and systems capable of altering, adjusting or controlling one or more aspects of the power delivered by the voltage source 102 to the load device 140. In at least one implementation, the control device 130 can include one or more controllers, processors, microcontrollers, digital signal processors (DSPs), application specific integrated circuits (ASICs), or other similar current or future developed logic controlled devices capable of executing one or more machine executable instruction sets. In at least some implementations, the one or more machine executable instruction sets may be stored in whole or in part within the controller, microcontroller, processor, or combinations thereof. In at least some implementations, the one or more machine executable instruction sets may be stored in whole or in part in a nontransitory storage media that may or may not include removable nontransitory storage media, or combinations thereof.

The one or more machine executable instruction sets may beneficially provide additional functionality to the one or more sensors 106 in the line voltage switching device 104. In at least some implementations, one or more sets of machine executable instructions may cause the control device 130 to preferentially alter one or more aspects of the power delivered by the voltage source 102 to the load device 140 to adjust or otherwise control one or more aspects of the load in response to a condition or event determined by the control device 130 rather than detected by the one or more environmental sensors 106.

In one example, one or more machine executable instruction sets may provide a photocell sensor 106 equipped luminaire load device 140 with an autonomous dimming feature where the luminous output of the luminaire load device 140 is reduced from a first level to a second, lower, level at a defined time after a sunset event detected by the photocell and then increased from the second level to a third, higher, level at a defined time before sunrise. Such functionality would be difficult to achieve using only an output signal 120 based on the operating state of the line voltage switching device 104, which will simply provide an indication of the electrical continuity of the switching device 107 based on the ambient light level sensed by the photocell sensor 106.

In another example, one or more machine executable instruction sets may provide a photocell sensor 106 equipped luminaire load device 140 with an autonomously created operating schedule that can be used by the luminaire load device 140 to provide dusk-to-dawn illumination should the photocell fail or otherwise become inoperative. In one such instance, the control device 130 may log data indicative of the date and time associated with each of 365 consecutive daily ON/OFF cycles which corresponds to 365 consecutive dusk-to-dawn cycles (i.e., a year's worth of dusk-to-dawn cycles). The logged data, corresponding to sunrise and sunset times detected by the at least one photocell sensor 106 can then be used by the luminaire load device 140 to maintain dusk-to-dawn functionality should the photocell sensor 106 fail or otherwise become inoperative.

In some implementations, the control device 130 can include one or more electrical, mechanical, electromechanical, or solid state switching devices that are selectively transitionable between any number of operating states, including at least one state in which the control device 130 permits the flow of some or all of the power from the voltage source 102 to the load device 140 and at least one other state in which the control device 130 prevents or otherwise impedes the flow of some or all of the power from the voltage source 102 to the load device 140. In such implementations, the operating state of control device 130 may be established or otherwise determined by one or more sets of machine executable instructions and based at least in part on the presence or absence of the output signal 120 at the high-impedance input 132 of the control device.

In at least some implementations, the control device 130 can include one or more power converters, for example one or more switched-mode power supplies, AC/DC converters, or similar devices. Including one or more power converters in the control device 130 may permit the replacement of the load device 140 with a similar replacement load device 140 offering greater energy efficiency and providing operational advantages unavailable with the original load device. For example, in at least one implementation, the control device 130 can include a switched-mode power supply that is communicably coupled to one or more controllers or microcontrollers. In such an implementation, a controller in the control device 130 may generate and supply one or more control signals to the switched-mode power supply. Responsive to one or more aspects of a control signal provided by the controller, the switched-mode power supply can alter one or more aspects of the power delivered to the load device 140, for example by adjusting a pulse-width or a pulse-frequency of the power signal provided to the load device 140. Such flexibility in power delivery, when combined with an energy efficient load device 140 such as a solid state lighting unit (e.g., light emitting diode or similar) can advantageously enhance energy efficiency or savings (e.g., via the auto-dimming feature described previously) while increasing the operational flexibility of the load device 140.

The load device 140 can include any number of electrical devices capable of drawing power from the voltage source 102. Example load devices 140 can include, without limitation, one or more incandescent lighting devices, one or more metal vapor lighting devices, one or more metal halide lighting devices, one or more fluorescent lighting devices, or similar. In at least some embodiments, the load device 140 can advantageously include at least one solid state lighting devices that include one or more light emitting diode ("LED") light sources, one or more organic LED ("OLED") light sources, or one or more polymer LED ("PLED") light sources. Although discussed in detail in the context of lighting, those of ordinary skill in the art will readily appreciate the utility of the systems, methods and apparatuses disclosed herein in operating other, non-lighting, electrical loads controlled by one or more sensor equipped line voltage switching devices.

Figure 2:
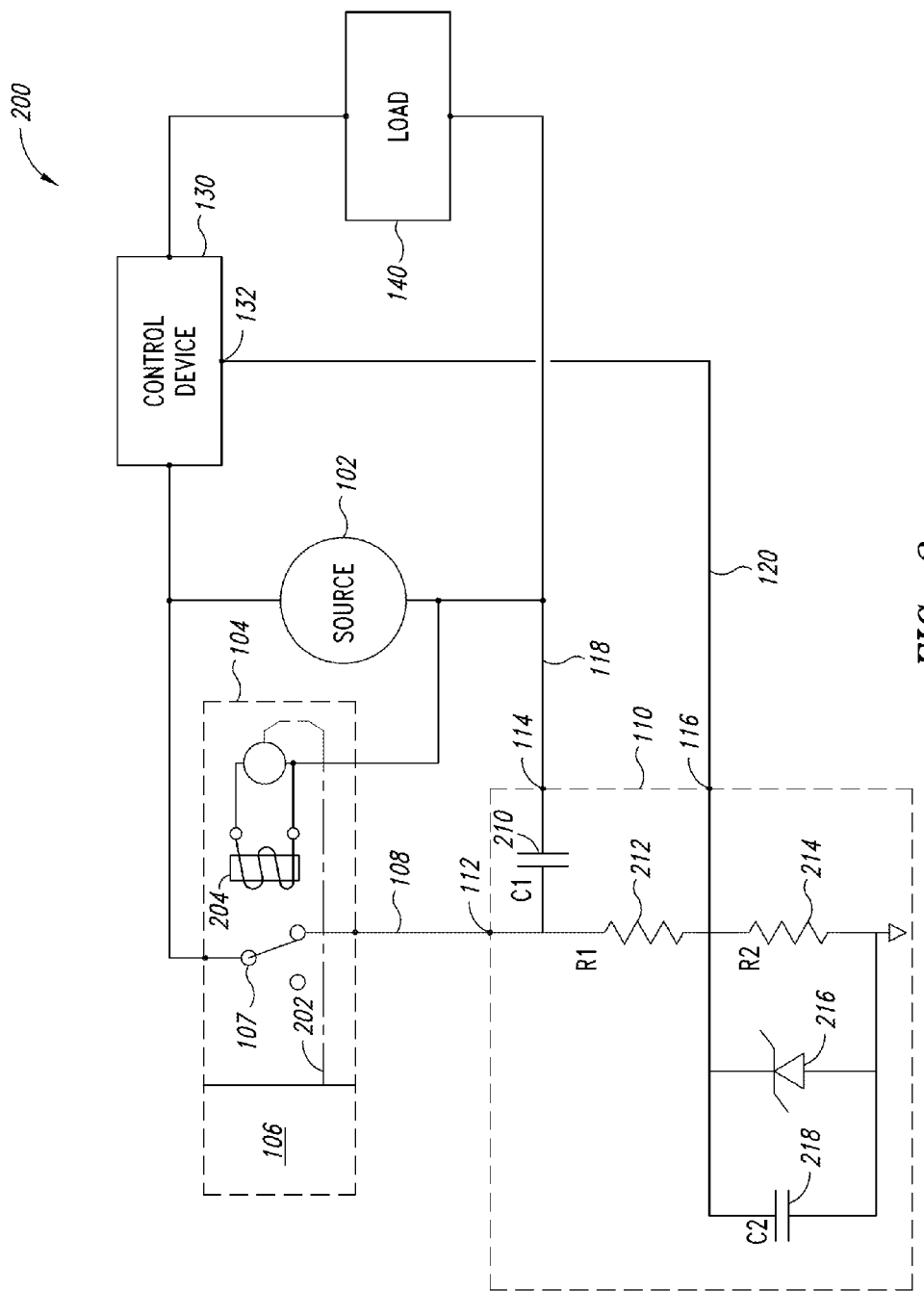

FIG. 2 shows a system 200 that provides additional details on illustrative components in the line voltage switching device 104 and the regulator 110, according to one non-limiting illustrated embodiment. In at least some instances, the line voltage switching device 104 can include an actuator 204 such as an electromechanical relay or similar pilot device to selectively, reversibly, transition the switching device 107 between at least one electrically continuous state and at least one electrically discontinuous state. In at least some instances, the one or more environmental sensors 106 generate or otherwise provide one or more sensor signals 202 used by the actuator 204 to position the switching device 107 in either the electrically continuous state or in the electrically discontinuous state.

One or more aspects (e.g., voltage, current, frequency, etc.) of the sensor signal 202 may correspond to the occurrence or lack of occurrence of one or more events in the environment about the at least one environmental sensor 106. For example, one or more aspects (e.g., voltage) of the sensor signal 202 provided by a photocell sensor 106 can correspond to an ambient illumination intensity level in the environment 150. The actuator 204 can transition the switching device 107 to an electrically discontinuous state when an aspect of the sensor signal 202 indicates an ambient illumination intensity level corresponding to daylight conditions in the environment 150, and in the electrically continuous state when an aspect of the sensor signal 202 indicates an ambient illumination intensity corresponding to evening or night conditions in the environment 150. In another example, one or more spectral aspects of a sensor signal 202 provided by a passive infrared ("PIR")

sensor can be related to the presence or movement of a relatively warm object or body in the environment 150 about the PIR sensor. The actuator 204 can transition the switching device 107 to an electrically discontinuous state when the spectral analysis of the sensor signal 202 fails to indicate the presence or movement of a warm object or body in the environment 150, and in the electrically continuous state when the spectral analysis of the sensor signal 202 indicates the presence or movement of a warm object in the environment 150.

The regulator 110 includes a first capacitive device 210 (labeled "C1") and a voltage divider comprising a first resistance 212 (labeled "R1") electrically serially coupled to a second resistance 214 (labeled "R2"). One or more components, devices, or systems may be electrically coupled to the voltage divider. In at least some implementations, one or more components, devices, or systems may be electrically coupled in parallel with the second resistance 214. Such components may advantageously be useful for conditioning, filtering, or otherwise limiting one or more aspects of the output signal 120.

In at least some implementations, devices or systems may include one or more overvoltage protection systems or devices 216 able to limit the voltage of the output signal 120 provided at the second node 116 to less than a defined threshold voltage value. In at least some implementations, devices or systems may also include one or more damping systems or devices 218 to reduce fluctuations in the voltage or current of the output signal 120 provided at the second node 116 to less than a defined threshold fluctuation value.

Responsive to the at least one environmental sensor 106 sensing or otherwise detecting the occurrence of an event in the environment about the line voltage switching device 104, the actuator 204 can selectively, reversibly transition the switching device 107 between at least one electrically continuous state and at least one electrically discontinuous state. In the electrically continuous state, at least a portion of the power provided by the voltage source 102 to the line voltage switching device 104 passes to the first node 112 as the line voltage signal 108. Since little impedance is present in the circuit containing the line voltage switching device 104, in most instances the line voltage signal 108 is at a voltage equal to the first voltage of the source 102. Thus, the line voltage signal 108 can have a voltage of from about 90 VAC to about 600 VAC.

A first capacitive device 210 is electrically, conductively, coupled between the first node 112 and the second node 114. In at least some implementations, the second node 114 may be communicably coupled to the electrical circuit containing the load device 140. A first portion of the current received at the first node (i.e., the current of line voltage signal 108) can flow through the first capacitive device 210 to the second node 114 thereby providing the first output 118 for return to the electrical circuit containing the load device 140. Advantageously, the first capacitive device 210 provides a substantially non-dissipative load to the first portion of the line voltage signal 108, thereby permitting the first output 118 to return to the electrical circuit containing the load device 140 substantially all of the power in the first portion of the line voltage signal 108.

The line voltage signal 108 current can be set based, at least in part, on the capacitance value of the first capacitive device 210. Thus, the capacitance value of the first capacitive device 210 may be selected to provide a sufficient current flow to reliably establish the line voltage signal 108 to the first node 112 when the switching device 107 is in an electrically continuous state. The capacitance value of the first capacitive device 210 may be selected between a minimum value that provides a current less than the inrush rating of the electrical contacts in the switching device 107, and a maximum value that maintains sufficient current flow to reliably maintain the line voltage signal 108 across the electrical contacts in the switching device 107. In one example, the first capacitive device 210 can have a capacitance value of 0.033 microfarads (µF) in a circuit driving a 40 watt solid state luminaire load device 140. While larger capacitance values for the first capacitive device 210 may limit the current and reduce the overall power drawn through the line voltage switching device 104, the selection of too large a capacitance value for the first capacitive device 210 may detrimentally impact the overall power factor of the load device 140.

The presence of the first capacitive device 210 between the first node 112 and the second node 114 causes a 90° phase shift between the current and voltage in the first output 118. The first output 118 thus returns current to the electrical circuit containing the load device 140 during every other quarter of the line cycle. The impact on the electrical circuit containing the load device 140 may be reduced by selecting the capacitance value of the first capacitive device 210 such that current through the line voltage switching device 104 is limited to the smallest quantity necessary to ensure a reliable delivery of the voltage signal 108 from the line voltage switching device 104 to the first node 112.

After the first portion of the line voltage signal 108 is returned to the electrical circuit containing the load device 140, the remaining portion of the line voltage signal 108 (which remains at the first voltage of the voltage source 102) flows into a voltage divider circuit including at least a first resistive device 212 serially electrically coupled to a second resistive device 214. A third node 116 electrically communicably coupled between the first resistive device 212 and the second resistive device 214 provides the signal output 120.

In at least some implementations, the resistance value of the first resistive device 212 and the resistance value of the second resistive device 214 may be selected to reduce the voltage of the remaining portion of the line voltage signal 108 to a second voltage level compatible with the high-impedance controller input 132. In at least some implementations, the resistance value of the first resistive device 212 may be set at a high resistance value (e.g., 1 MΩ) to provide the high-impedance controller input 132 with significant protection from line voltage transients or surge voltages. The resistance value of the first resistive device 212 and the second resistive device may be selected to provide a signal output 120 having a second voltage of less than about 24 volts; less than about 9 volts; less than about 7.5 volts; less than about 5 volts; less than about 3 volts; or less than about 1 volt. The capacitance of the first capacitive device 210, and consequently the quantity of current directed from the line voltage signal 108 to the first output 118, can determine the second current of the signal output 120. The capacitance of the first capacitive device 210 can be selected to provide a signal output 120 having a second current of less than 20 milliamps ("mA"); less than 10 mA; less than 5 mA; less than 1 mA; less than 500 microamps ("µA"); less than 100 µA; less than 10 µA; or less than 1 µA.

In at least some implementations, the regulator 110 may include one or more systems, devices, or combination of systems and devices to condition, filter, alter, adjust, or tune one or more aspects of the signal output 120. In at least some implementations, at least one overvoltage protection device 216 may be installed in electrical parallel with the second resistive device 214 to limit the voltage of the output signal 120 to less than a threshold voltage value. In at least some instances, the threshold voltage value can be determined at least in part based on the maximum allowable input voltage to the high-impedance controller input 132. The threshold voltage value can be about 24 volts; about 9 volts; about 7.5 volts; about 5 volts; about 3 volts; or about 1 volt. In at least some implementations, the at least one overvoltage protection device 216 can include one or more diodes or other semiconductor based voltage regulation systems or devices. For example, in at least one instance the overvoltage protection device 216 can include at least one zener diode.

In at least some implementations, the regulator 110 may include either alone or in combination with one or more other systems, devices, or combination of systems and devices, at least one fluctuation damping device 218. In at least some implementations, the at least one fluctuation damping device 218 may be installed in electrical parallel with the second resistive device 214 and any other output signal conditioning systems or devices to limit or reduce any current fluctuation, voltage fluctuation, or combination thereof present in the output signal 120 to less than a defined fluctuation threshold value. For example, a second capacitive device 218 may be coupled in electrical parallel with the second resistive device 214 to dampen or otherwise reduce the fluctuation, smoothen, or de-bounce one or more aspects (e.g., voltage, current, frequency, etc.) of the output signal 120. In at least some instances, the threshold voltage value can be determined at least in part based on the maximum allowable input voltage to the high-impedance controller input 132.

Although only an overvoltage protection device 216 and a fluctuation damping device 218 are discussed in detail above, those of ordinary skill in the art will readily appreciate that other signal conditioning systems, devices, or combinations of systems and devices may be electrically coupled to one or more nodes of the regulator 110 to provide a wide variety of both first signal 118 and output signal 120 characteristics.

Figure 3:
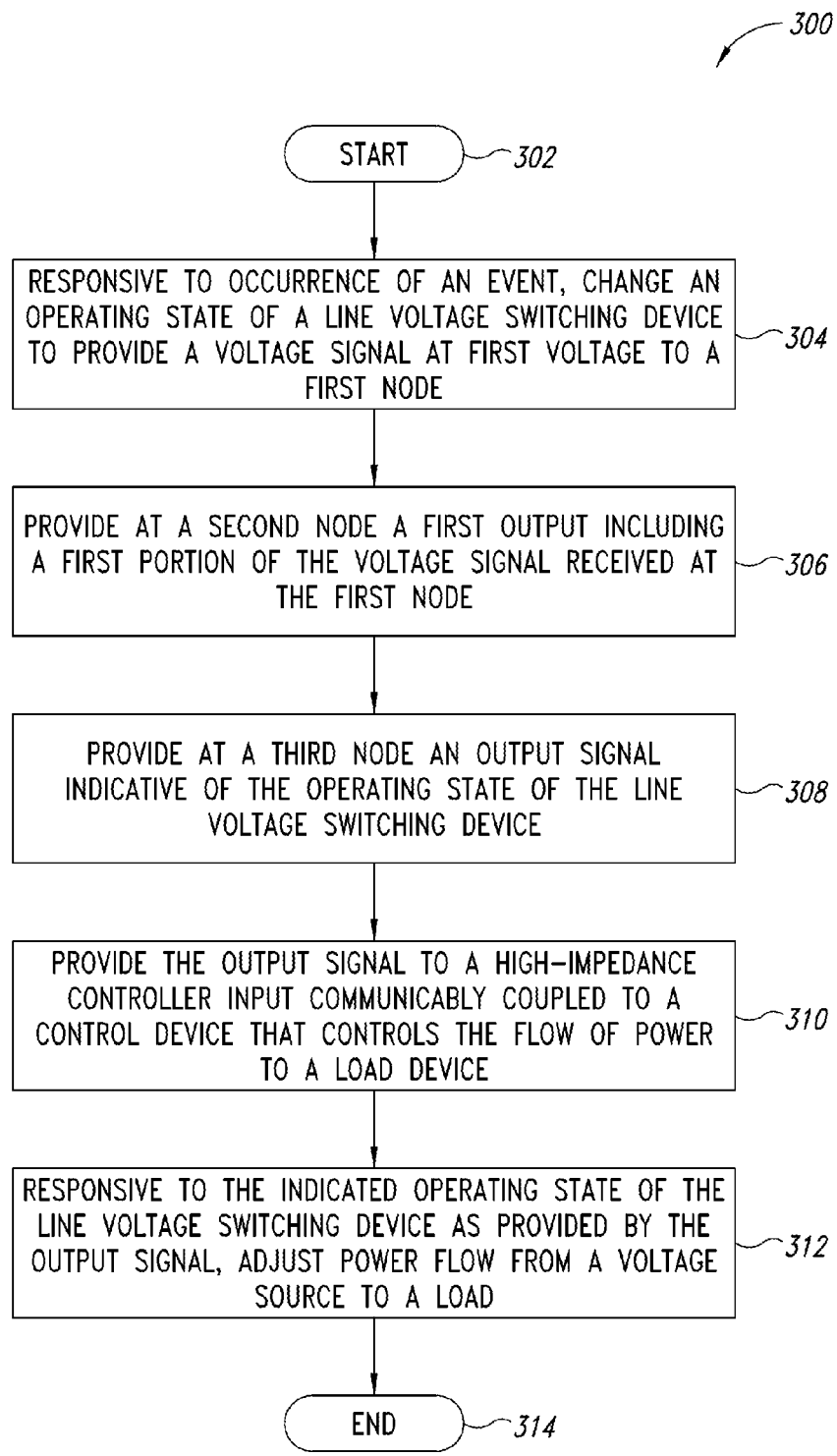

FIG. 3 shows a method 300 of implementing one such high current switching device as a logic level sensor, according to one illustrated embodiment. In some instances, a sensor equipped line voltage switching device 104 may be used to control the supply of power from a voltage source 102 to a legacy load device, thereby causing the legacy load device to enter any number of selected operating states. For example, a photocell equipped line voltage switching device 104 may be used in a luminaire to control the flow of power from a power grid (i.e., voltage source 102) to a legacy, 277 VAC, high pressure sodium ("HPS") lighting device based on the sensed ambient illumination level. Replacing the legacy HPS lighting device with a higher efficiency load device 140 such as solid state lighting device often includes installing a power converter which may incorporate a control device 130 to control one or more operational aspects of the solid state lighting device. While the photocell 106 in the line voltage switching device 104 may properly actuate the switching device 107 responsive to the ambient illumination level in the environment 150, the electrical contacts in the switching device 107 may be incapable of reliably passing a relatively low current, low voltage, signal indicative of the photocell output to the high-impedance input 132 on the control device 130. The method 300 provides a way of using a relatively high current rated, sensor equipped, line voltage switching device 104 to provide a relatively low current output signal indicative of the sensor output to a high-impedance controller input 132. The method 300 thus, advantageously, reduces or even eliminates the need to replace a line voltage switching device controlling a legacy load device after replacing the legacy load device, for example with a more energy efficient load device 140. The method commences at 302.

At 304 the actuator 204 transitions the operational state of the switching device 107 responsive to the sensor output 202 of the at least one environmental sensor 106. In at least some instances, the operational state of the switching device is transitioned from an electrically discontinuous state (e.g., an OFF or OPEN state) to an electrically continuous state (e.g., an ON or CLOSED state) based on a sensor output 202 indicative of the occurrence or lack of occurrence of a defined event in the environment 150. Such events may include, without limitation, a sensed or detected change in ambient illumination in the environment 150, a sensed or detected movement of a body or an object in the environment 150, a sensed or detected presence of a body or an object in the environment 150, or any combination thereof.

Upon effecting the change in operational state of the switching device 107 to an electrically conductive state, the voltage output 108 flows through the switching device 107 to the first node 112 of the regulator 110. In at least some implementations, the line voltage signal 108 at the first voltage and the first current is provided to the first node 112 each time the switching device 107 transitions to an electrically conductive operating state and persists as long as the switching device 107 remains in the electrically conductive operating state.

At 306, the regulator provides at a second node 114 a first portion of the line voltage signal 108 received at the first node 112. A first output 118 including at least a first portion of the line voltage signal 108 received at the first node 112 is provided at the second node 114. In at least some instances, all or a portion of the first output 118 can be introduced to an electrical circuit containing the load device 140. At least one first capacitive device 210 may be electrically communicably coupled between the first node 112 and the second node 114. Advantageously, such a first capacitive device 210 presents a substantially non-dissipative load that permits the return of at least a portion of the power provided by the first portion of the line voltage signal 108 to the electrical circuit containing the load device 140. The presence of the first capacitive device 210 causes the current to lag the voltage by 90° in the first output 118.

At 308, the remaining portion of the line voltage signal 108 can be provided to a voltage divider circuit including a first resistive device 212 serially electrically coupled to a second resistive device 214. An output signal 120 can be provided at a third node 116 electrically communicably coupled between the first resistive device 212 and the second resistive device 214. In at least some instances, the resistance value of either or both of the first resistive device 212 and the second resistive device 214 may be selected or otherwise determined based on one or more desired aspects or characteristics of the output signal 120 provided at the third node 116. For example, in at least some implementations, the resistance values of the first resistive device 212 and the second resistive device 214 may be chosen to provide an output signal 120 having one or more desired voltage ranges, one or more desired current ranges, or both. In at least some implementations, resistance values for the first resistive device 212 and the second resistive device 214 may be selected to provide an output signal 120 at a second voltage that is less than the first voltage and a second current that is less than the first current. The output signal 120 can indicate the electrical operating state of the switching device 107 and thus provides a reliable indication of the output of the at least one environmental sensor 106.

At 310, a high-impedance controller input 132 receives the output signal 120. In at least some instances, the high-impedance controller input 132 is communicably coupled to a control device 130 that controls one or more aspects of the power delivered from the voltage source 102 to the load device 140.

At 312, responsive to the receipt of the output signal 120 at the high-impedance controller input 132, the control device 130 can alter, adjust, or control one or more aspects of the power provided by the voltage source 102 to the load device 140. In some implementations, the control device 130 may simply permit power flow from the voltage source 102 to the load device 140 when the output signal 120 is present and halt power flow from the voltage source 102 to the load device 140 when the output signal 120 is absent. The presence of the control device 130 advantageously permits the use of other, more complex control schemes to deliver power from the voltage source 102 to the load device 140. Such operational flexibility can provide additional opportunities for improving load device energy efficiency and control flexibility that would be difficult or impossible to accomplish using only one or more legacy line voltage switching devices 104 to control the flow of power between the voltage source 102 and the load device 140.

In at least some implementations, the control device 130 can maintain the flow of power from the voltage source 102 to the load device 140 at or above a defined threshold when one or more aspects of the signal output 120 rise above a defined output signal threshold at the high-impedance controller input 132 and maintain the flow of power from the voltage source 102 to the load device 140 below the defined threshold when one or more aspects of the signal output 120 fall below the defined output signal threshold at the high-impedance controller input 132.

In other implementations, responsive to the receipt of the signal output 120, the control device 130 can provide one or more control signals to an active rectification converter including at least one DC/DC converter, at least one AC/DC converter, or at least one DC/AC converter. In at least some instances, the control device 130 may provide one or more pulse-width modulated ("PWM") control signals to any number of semiconductor switches (e.g., metal-oxide semiconductor field effect transistors or "MOSFETs," insulated gate bipolar transistor or "IGBTs," or triode for alternating current or "TRIACs") to control the conversion and delivery of power from the voltage source 102 to the load device 140 via one or more PWM-controlled active rectifiers.

In yet other implementations, the control device 130 can include one or more controllers, microcontrollers, or processors capable of executing one or more machine executable instruction sets. In such instances, the control device 130 can alter, adjust or control the flow of power from the voltage source 102 to the load device 140 in accordance with logic or similar instructions encoded in one or more machine executable instruction sets when one or more aspects of the signal output 120 rise above a defined output signal threshold at the high-impedance controller input 132.

In yet other implementations, the control device 130 can include a solid state lighting controller including one or more controllers, microcontrollers, or processors capable of executing one or more machine executable instruction sets and a switched-mode power supply suitable for powering a load device 140 that includes one or more solid state lighting devices each containing one or more solid state light sources. In at least this implementation, power provided by the voltage source 102 may be converted by the control device 130 to at least one of: a PWM or pulse-frequency modulated ("PFM") power signal. The PWM or PFM power signal can be provided by the control device 130 to the load device 140 based on one or more aspects of the output signal 120 at the high-impedance controller input 132. In at least some instances, the one or more controllers, microcontrollers, or processors in the control device 130 can alter or adjust one or more parameters (e.g., pulse width, pulse frequency, etc.) of the PWM or PFM power signal provided to the load device 140 to alter one or more performance characteristics of the load device 140. For example, a controller in the control device 130 may alter the pulse width of a PWM power signal provided to a load device 140 comprising a solid state lighting device to selectively dim or brighten the solid state lighting device in accordance with logic or instructions contained in one or more machine executable instruction sets. The method 300 concludes at 314.

Figure 4:
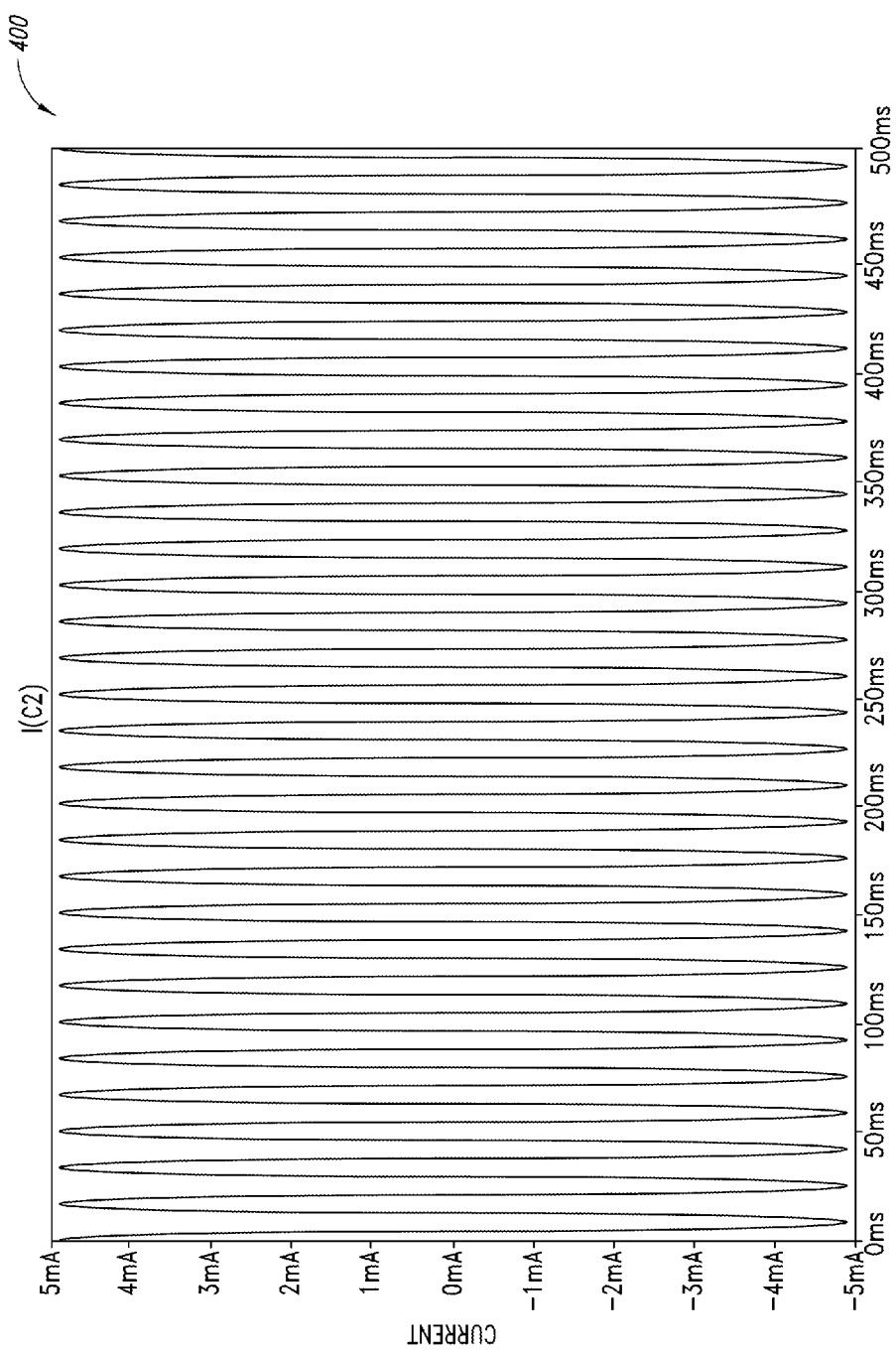
FIG. 4 is a hypothetical plot showing current as a function of time for an example output signal provided to a high-impedance controller input using a line voltage signal at a first voltage of 277 VAC in the illustrative system shown in FIG. 2, according to one non-limiting illustrated embodiment.

FIG. 4 shows an illustrative hypothetical plot 400 of the second current as a function of time at a first voltage of 277 VAC when the line voltage switching device 104 is in an electrically conductive state, according to one or more illustrated embodiments. The second current delivered by the output signal 120 to the high-impedance controller input varies between −5 mA and +5 mA.

Figure 5:
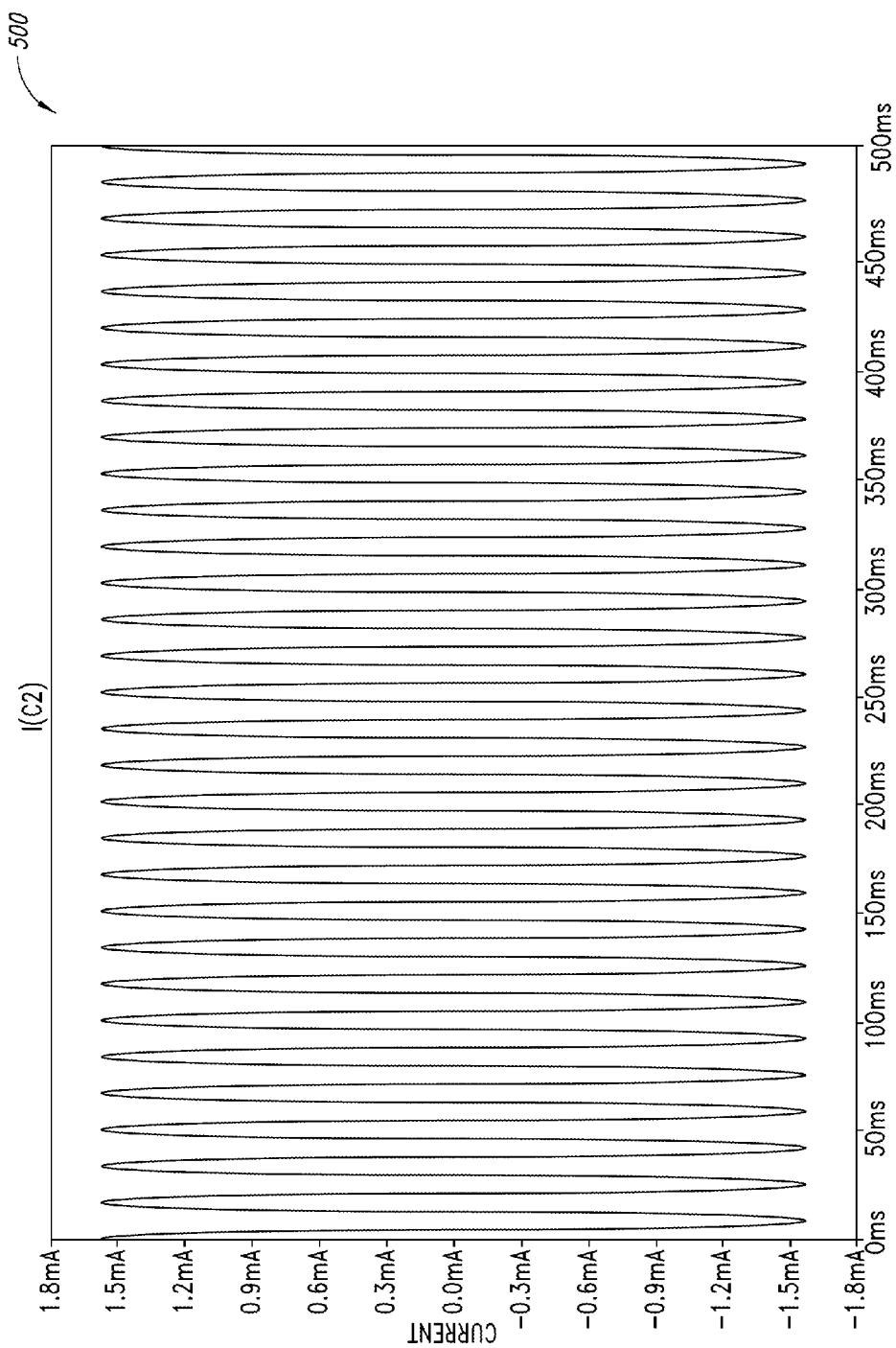
FIG. 5 is a hypothetical plot showing current as a function of time for an example output signal provided to a high-impedance controller input using a line voltage signal at a first voltage of 90 VAC in the illustrative system shown in FIG. 2, according to one non-limiting illustrated embodiment.

FIG. 5 shows an illustrative hypothetical plot 500 of the second current as a function of time at a first voltage of 90 VAC when the line voltage switching device 104 is in an electrically conductive state, according to one or more illustrated embodiments. The second current delivered by the output signal 120 to the high-impedance controller input varies between −1.5 mA and +1.5 mA. Comparing the second current plots in FIGS. 3 and 4 reveals that a common regulator 110 may be used for any first (or line) voltage of from about 90 VAC to about 277 VAC while still providing an output signal 120 having a second current that ranges from about +/−1.5 mA to +/−5 mA. Such second currents are suitable for introduction to the high-impedance controller input 132.

Figure 6:
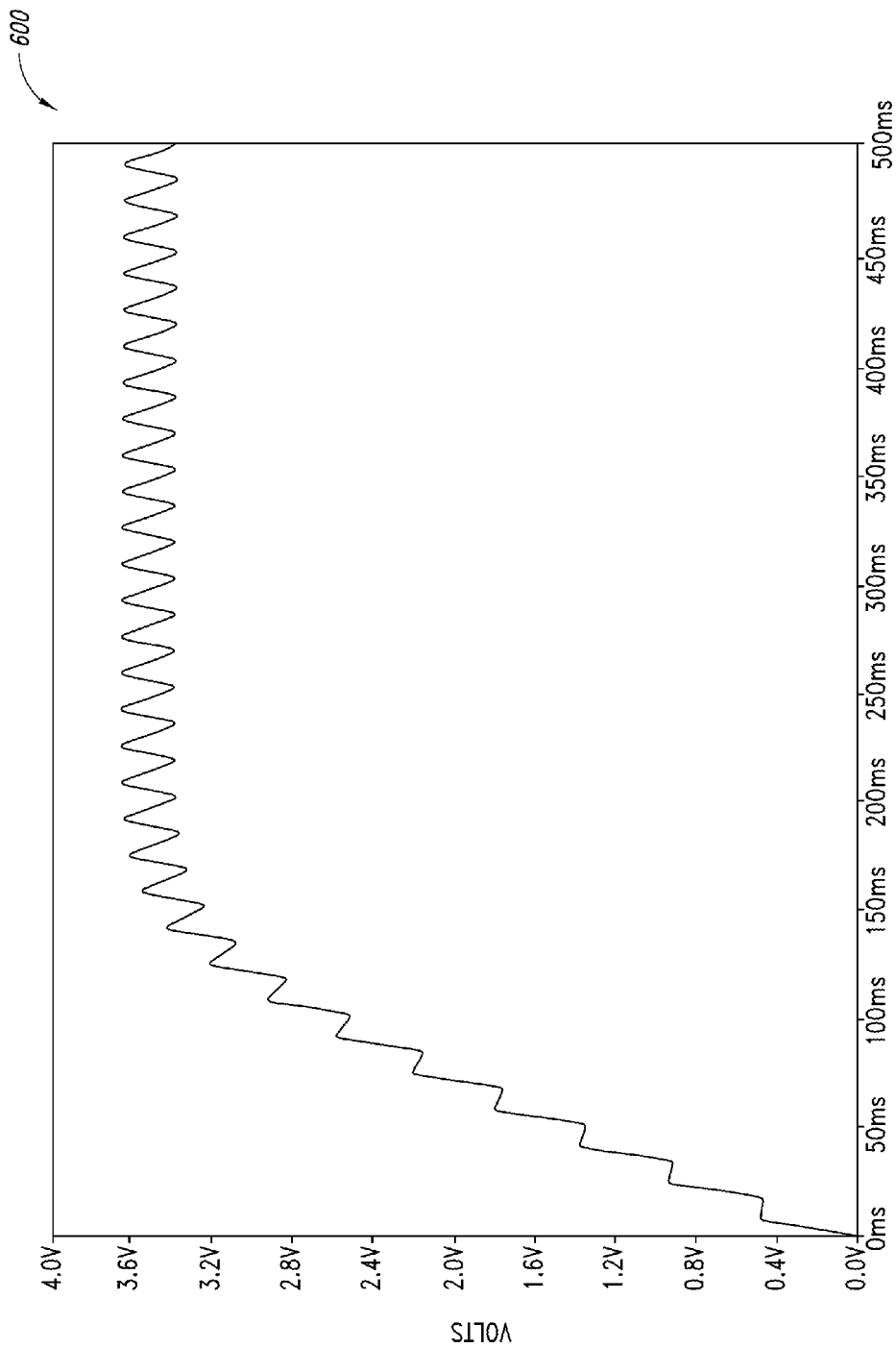
FIG. 6 is a hypothetical plot showing voltage as a function of time for an example output signal provided to a high-impedance controller input by the illustrative system shown in FIG. 2, according to one non-limiting illustrated embodiment.

FIG. 6 shows an illustrative hypothetical plot 600 of the second voltage as a function of time for the output signal 120 provided at the third node 116 when the line voltage switching device 104 is in an electrically conductive state, according to one or more illustrated embodiments. The use of one or more fluctuation damping devices 218 has provided an output signal 120 having a second voltage of about 3.3+/−0.5 V suitable for introduction to the high-impedance controller input 132.

Also for example, the various methods may include additional acts, omit some acts, and may perform the acts in a different order than set out in the various flow diagrams. The use of ordinals such as first, second and third, do not necessarily imply a ranked sense of order, but rather may only distinguish between multiple instances of an act or structure.

Also for example, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by one or more controllers (e.g., microcontrollers), as one or more programs executed by one or more processors (e.g., microcontrollers), as firmware, or as virtually any combination thereof, and that designing the circuitry and/or writing the code for the software and/or firmware would be well within the skill of one of ordinary skill in the art in light of the teachings of this disclosure. For example, the control subsystem may include an analog electronic delay circuit such as a capacitor based timer circuit with defined delay times, to implement one or more of the specific adjustment times (e.g., times as indicated by the clock when light sources will be turned ON, decreased output, increased output, turned OFF).

When logic is implemented as software and stored in memory, logic or information can be stored on any computer-readable medium for use by or in connection with any processor-related system or method. In the context of this disclosure, a memory is a computer-readable storage medium that is an electronic, magnetic, optical, or other physical device or means that non-transitorily contains or stores a computer and/or processor program. Logic and/or information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/052,924, filed May 13, 2008; U.S. Patent Publication No. US 2009/0284155, published Nov. 19, 2009; U.S. Provisional Patent Application No. 61/051,619, filed May 8, 2008; U.S. Pat. No. 8,118,456, issued Feb. 12, 2012; U.S. Provisional Patent Application No. 61/088,651, filed Aug. 13, 2008; U.S. Patent Publication No. US 2010/0090577, published Apr. 15, 2010; U.S. Provisional Patent Application No. 61/115,438, filed Nov. 17, 2008; U.S. Provisional Patent Application No. 61/154,619, filed Feb. 23, 2009; U.S. Patent Publication No. US2010/0123403, published May 20, 2010; U.S. Provisional Patent Application No. 61/174,913, filed May 1, 2009; U.S. Patent Publication No. US2010/0277082, published Nov. 4, 2010; U.S. Provisional Patent Application No. 61/180,017, filed May 20, 2009; U.S. Patent Publication No. US2010/0295946, published Nov. 25, 2010; U.S. Provisional Patent Application No. 61/229,435, filed Jul. 29, 2009; U.S. Patent Publication No. US2011/0026264, published Feb. 3, 2011; U.S. Provisional Patent Application No. 61/295,519 filed Jan. 15, 2010; U.S. Provisional Patent Application No. 61/406,490 filed Oct. 25, 2010; U.S. Patent Publication No. US2011/0175518, published Jul. 21, 2011; U.S. Provisional Patent Application Ser. No. 61/333,983, filed May 12, 2010; U.S. Patent Publication No. US2010/0295454, published Nov. 25, 2010; U.S. Provisional Patent Application Ser. No. 61/346,263, filed May 19, 2010, U.S. Patent Publication No. US2010/0295455, published Nov. 25, 2010; U.S. Provisional Patent Application Ser. No. 61/357,421, filed Jun. 22, 2010; U.S. Patent Publication No. US2011/0310605, published Dec. 22, 2011; U.S. Patent Publication No. 2012/0262069, published Oct. 18, 2012; U.S. Non-Provisional patent application Ser. No. 13/212,074, filed Aug. 17, 2011; U.S. Provisional Patent Application Ser. No. 61/527,029, filed Aug. 24, 2011; U.S. Non-Provisional patent application Ser. No. 13/592,590 filed Aug. 23, 2012; U.S. Provisional Patent Application Ser. No. 61/534,722, filed Sep. 14, 2011; U.S. Non-Provisional patent application Ser. No. 13/619,085, filed Sep. 14, 2012; U.S. Provisional Patent Application Ser. No. 61/567,308, filed Dec. 6, 2011; U.S. Provisional Patent Application Ser. No. 61/561,616, filed Nov. 18, 2011; U.S. Provisional Patent Application Ser. No. 61/641,781, filed May 2, 2012; U.S. Non-Provisional patent application Ser. No. 13/411,321 filed Mar. 2, 2012; U.S. Provisional Patent Application Ser. No. 61/640,963, filed May 1, 2012; U.S. Non-Provisional patent application Ser. No. 13/558,191 filed Jul. 25, 2012; U.S. Provisional Patent Application Ser. No. 61/692,619, filed Aug. 23, 2012; U.S. Provisional Patent Application Ser. No. 61/694,159, filed Aug. 28, 2012; U.S. Non-Provisional patent application Ser. No. 13/604,327 filed Sep. 5, 2012; U.S. Provisional Patent Application Ser. No. 61/723,675, filed Nov. 7, 2012; U.S. Non-Provisional patent application Ser. No. 13/679,687, filed Nov. 16, 2012; U.S. Provisional Patent Application Ser. No. 61/728,150, filed Nov. 19, 2012; and U.S. Provisional Patent Application Ser. No. 61/764,395, filed Feb. 13, 2013 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system to permit a line voltage switching device operable at a first voltage and a first current to provide, when in an electrically continuous state, an output signal to a high-impedance controller input used to control the delivery of power at the first voltage from a line voltage source to a load device, the system comprising:

a first node electrically, communicably, coupled to the line voltage switching device to receive a line voltage signal from the line voltage switching device when the line voltage switching device is in the electrically continuous state;

a second node that outputs at the first voltage a first portion of the line voltage signal received at the first node, the second node electrically, communicably, coupled through at least one first capacitive device to the first node;

a voltage divider electrically, communicably, coupled to the first node, the voltage divider including at least a first resistive device serially electrically coupled to a second resistive device; and a third node that provides a second portion of the line voltage signal received at the first node as the output signal indicative of the electrically continuous state of the line voltage switching device to the high-impedance controller input, the third node electrically, communicably, coupled between the first resistive device and the second resistive device, the output signal at a second voltage lower than the first voltage and the output signal at a second current that is lower than the first current.

2. The system of claim 1, further comprising the line voltage switching device that selectively, reversibly, switches between at least the electrically continuous state and an electrically discontinuous state responsive to an occurrence or lack of an occurrence of at least one event.

3. The system of claim 2, further comprising the line voltage source operating at the first voltage, the line voltage source electrically, communicably coupled to the line voltage switching device and to at least one controller that includes the high-impedance controller input.

4. The system of claim 3, further comprising the load device electrically, communicably coupled through at least one controller to the voltage source.

5. The system of claim 4 wherein the load device comprises at least one solid state lighting device including at least one solid state light source.

6. The system of claim 5, wherein the first voltage comprises an alternating current ("A.C.") voltage and the at least one controller includes a power converter that converts the A.C. voltage provided by the voltage source to a power signal provided to the at least one solid state lighting device when the line voltage switching device is in the electrically continuous state.

7. The system of claim 6 wherein the power converter further comprises a switched-mode power supply and the power signal provided to the at least one solid state lighting device includes at least one of: a pulse-width modulated power signal or a pulse-frequency modulated power signal.

8. The system of claim 2 wherein the line voltage switching device comprises a photosensitive device that selectively, reversibly, enters the electrically continuous state based on the occurrence of an event corresponding to a level of ambient illumination proximate the photosensitive device: rising above one or more defined ambient illumination thresholds, or falling below one or more defined ambient illumination thresholds.

9. The system of claim 1, further comprising at least one overvoltage protection device that limits the second voltage of the output signal provided at the third node to less than a defined second voltage threshold, the at least one overvoltage protection device electrically coupled in parallel with the second resistive device.

10. The system of claim 9 wherein the at least one overvoltage protection device comprises at least one zener diode.

11. The system of claim 1, further comprising at least one damping device that dampens fluctuations in the second current of the output signal provided at the third node to less than a defined current threshold, the at least one damping device electrically coupled in parallel with the second resistive device.

12. The system of claim 11 wherein the at least one damping device comprises at least one second capacitor.

13. A method to permit a line voltage switching device operable at a first voltage and a first current to provide, when in an electrically continuous state, an output signal to a high-impedance controller input used to control the delivery of power at the first voltage from a line voltage source to a load device, the method comprising:

receiving a line voltage signal at a first node, the first node electrically, communicably, coupled to the line voltage switching device, the line voltage signal indicative of the presence of the line voltage switching device in the electrically continuous state;

communicating a first output at the first voltage and including at least a first portion of the line voltage signal received at the first interface at a second node, the second node electrically, communicably, coupled through at least one first capacitive device to the first node;

introducing at least a second portion of the line voltage signal received at the first node to a voltage divider electrically, communicably, coupled to the first node, the voltage divider including at least a first resistive device serially electrically coupled to a second resistive device; and communicating the output signal including at least a portion of the second portion of the line voltage signal to the high-impedance controller input via a third node, the third node electrically, communicably, coupled between the first resistive device and the second resistive device, the output signal at a second voltage that is lower than the first voltage and at a second current that is lower than the first current, the output signal indicative of the line voltage switching device in the electrically continuous state.

14. The method of claim 13, further comprising:
limiting the second voltage to less than a defined second voltage threshold via at least one overvoltage protection device electrically, communicably, coupled in parallel with the second resistive device.

15. The method of claim 14, further comprising:
limiting the fluctuation of the second current via at least one damping device electrically, communicably, coupled in parallel with the second resistive device and the overvoltage protection device.

16. The method of claim 13 wherein receiving a line voltage signal indicative of the line voltage switching device in an electrically continuous state at the first node comprises:
receiving the line voltage signal when the line voltage switching device is in an electrically continuous state responsive to an occurrence or lack of an occurrence of at least one event.

17. The method of claim 16 wherein receiving the line voltage signal when the line voltage switching device is in an electrically continuous state responsive to an occurrence or lack of an occurrence of at least one event comprises:
receiving the line voltage signal when the line voltage switching device is in an electrically continuous state responsive to an occurrence or lack of an occurrence of at least one of: an event corresponding to a change in ambient lighting levels, or an event corresponding to movement of an object or a body.

18. The method of claim 13, further comprising:
receiving the output signal at the high-impedance controller input; and
responsive to receipt of the output signal at the high-impedance controller input, adjusting by the controller a flow of power from the line voltage source to the communicably coupled load device.

19. The method of claim 13 wherein communicating a first output at a second node, the first output at the first voltage and including a first portion of the line voltage signal received at the first node comprises:

communicating at least a portion of the first output to a circuit electrically communicably coupled between the second node and the at least one load.

20. An apparatus to permit a photosensitive line voltage switching device operated at a first voltage and controlling the operation of a solid state illumination device to provide a first output signal at the first voltage to an electrically coupled circuit and a signal output to a controller high-impedance input, the signal output indicative of the photosensitive line voltage switching device maintaining an electrically continuous state, the apparatus comprising:

at least one first node that receives a voltage signal at the first voltage and the first current from the photosensitive line switching device when the photosensitive line switching device is placed in at least one electrically continuous state;

at least one second node that provides the first output signal to the electrically coupled circuit including the solid state illumination device, the at least one second node electrically coupled through at least one first capacitive device to the at least one first interface, the first output signal including at least a first portion of the voltage signal at the first voltage;

at least one voltage divider that accepts at least a second portion of the voltage signal at the first voltage, the at least one voltage divider electrically coupled to the at least one first interface, the at least one voltage divider including at least a first resistive device serially electrically coupled to a second resistive device;

at least one third node that provides the signal output indicative of the photosensitive line voltage switching device being placed in the given electrically continuous state to the high-impedance controller input, the at least one third node electrically coupled between the first resistive device and the second resistive device, the signal output at a second voltage that is lower than the first voltage.

21. The apparatus of claim 20, further comprising:

at least one second capacitive device that dampens current fluctuations in the second output signal, the at least one second capacitive device electrically coupled in parallel with the second resistive device.

22. The apparatus of claim 21, further comprising:

at least one overvoltage protection device that maintains the second voltage below a defined second voltage threshold, the at least one overvoltage protection device electrically coupled in parallel with the second resistive device and the at least one second capacitive device.

* * * * *